(12) United States Patent
Takahashi et al.

(10) Patent No.: US 11,131,583 B2
(45) Date of Patent: Sep. 28, 2021

(54) OBJECT STATE DETECTION AND TRANSMISSION SYSTEM

(71) Applicant: NATIONAL UNIVERSITY CORPORATION HOKKAIDO UNIVERSITY, Hokkaido (JP)

(72) Inventors: Yukihiro Takahashi, Hokkaido (JP); Nobuyasu Naruse, Hokkaido (JP)

(73) Assignee: NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 509 days.

(21) Appl. No.: 16/087,940

(22) PCT Filed: Aug. 21, 2017

(86) PCT No.: PCT/JP2017/029791
§ 371 (c)(1),
(2) Date: Sep. 24, 2018

(87) PCT Pub. No.: WO2018/038052
PCT Pub. Date: Mar. 1, 2018

(65) Prior Publication Data
US 2020/0319024 A1    Oct. 8, 2020

(30) Foreign Application Priority Data
Aug. 22, 2016   (JP) .............................. JP2016-162160

(51) Int. Cl.
*G01J 3/02*     (2006.01)
*G01N 21/27*   (2006.01)
(Continued)

(52) U.S. Cl.
CPC ........... *G01J 3/0272* (2013.01); *G01J 3/0256* (2013.01); *G01J 3/0278* (2013.01); *G01J 3/0289* (2013.01);
(Continued)

(58) Field of Classification Search
CPC ........ G01J 3/0278; G01J 3/0289; G01J 3/027; G01J 3/0256; G01J 3/0272; G01N 21/27;
(Continued)

(56) References Cited

U.S. PATENT DOCUMENTS

2014/0152985 A1    6/2014   Buchhorn et al.
2014/0293091 A1*  10/2014   Rhoads ..................... G01J 3/51
                                                              348/234
(Continued)

FOREIGN PATENT DOCUMENTS

EP    2 741 264       6/2014
JP    2002-500754    1/2002
(Continued)

OTHER PUBLICATIONS

English translation of International Preliminary Report on Patentability and Written Opinion dated Mar. 7, 2019 in International (PCT) Application No. PCT/JP2017/029791.
(Continued)

Primary Examiner — Sang H Nguyen
(74) Attorney, Agent, or Firm — Wenderoth, Lind & Ponack, L.L.P.

(57) ABSTRACT

An object state detection and transmission system includes a spectrometer configured to measure a reflectance spectrum based on reflected light reflected by a target object, a spectroscopic terminal apparatus integrally provided with an electronic device, the spectroscopic terminal apparatus being configured to receive a measured reflection spectrum; and a server apparatus connected to the spectroscopic terminal apparatus via a communication line. The electronic device includes a photographic camera configured to photograph the target object to capture a photographed image; a Global Positioning System (GPS) communication unit configured to measure a position of the target object; a
(Continued)

sensor configured to measure an azimuth and an angle of the target object; a Central Processing Unit (CPU) configured to clock a current time of the photographing and the measurement; and a wireless communication unit configured to transmit resultant data to the server apparatus.

13 Claims, 16 Drawing Sheets

(51) Int. Cl.
| | |
|---|---|
| *G01N 21/31* | (2006.01) |
| *G01N 21/01* | (2006.01) |
| *G01N 21/17* | (2006.01) |
| *G01N 21/84* | (2006.01) |
| *G01S 19/01* | (2010.01) |
| *H04M 1/72403* | (2021.01) |

(52) U.S. Cl.
CPC .............. *G01N 21/27* (2013.01); *G01N 21/31* (2013.01); *G01N 2021/0118* (2013.01); *G01N 2021/1797* (2013.01); *G01N 2021/8466* (2013.01); *G01S 19/01* (2013.01); *H04M 1/72403* (2021.01)

(58) Field of Classification Search
CPC .................. G01N 21/31; G01N 21/84; G01N 2201/0214; G01N 2201/0616; G01N 2021/0118; G01N 2201/0221; G01N 2021/8466; G01N 2021/1797; H04M 1/72403; G01S 19/01
See application file for complete search history.

(56) References Cited

U.S. PATENT DOCUMENTS

| | | | | |
|---|---|---|---|---|
| 2015/0371431 | A1* | 12/2015 | Korb .................. | G06K 9/00208 382/113 |
| 2016/0069743 | A1 | 3/2016 | McQuilkin et al. | |
| 2016/0231171 | A1 | 8/2016 | Assefa et al. | |
| 2017/0358106 | A1 | 12/2017 | Yoshimura et al. | |

FOREIGN PATENT DOCUMENTS

| | | |
|---|---|---|
| JP | 2006-314215 | 11/2006 |
| JP | 2006-317195 | 11/2006 |
| JP | 2007-124932 | 5/2007 |
| JP | 2008-076346 | 4/2008 |
| JP | 2012-159375 | 8/2012 |
| JP | 2012-196167 | 10/2012 |
| JP | 10-2014-0074185 | 6/2014 |
| JP | 2015-077113 | 4/2015 |
| JP | 2015-223101 | 12/2015 |
| JP | 2016-127806 | 7/2016 |
| KR | 2003-0010025 | 2/2003 |
| KR | 10-2014-0074185 | 6/2014 |
| WO | 98/40765 | 9/1998 |
| WO | 2015/195746 | 12/2015 |

OTHER PUBLICATIONS

International Search Report dated Oct. 10, 2017 in International (PCT) Application No. PCT/JP2017/029791, with English Translation.

Notification of Reasons for Refusal dated Jan. 30, 2018 in Japanese Application No. 2017-561784, with Machine Translation.

"Sekonic Corporation, "Spectroscopic-Type Color Meter SpectroMaster C-700", Internet, [Search Date: Aug. 16, 2016], URL: http://www.sekonic.com/united-states/products/c-700/overview.aspx", with Partial English Translation.

SiCO, "Spectrometer", Internet, [Search Date: Aug. 16, 2016], URL: https://www.consumerphysics.com/myscio/scio.

"Oki Kazuo, et al., "Classification Methods for Vegetation in Urban Area using Hyperspectruml Data", Eco-Engineering, 17(1), pp. 67-72, 2005", with English Abstract.

"Hokkaido Satellite Co., Ltd., "Grass and Ground, and for Photographing Target", Internet, [Search Date: Aug. 16, 2016], URL: http://www.hokkaido-sat.co.jp/casestudy-data/plant/plant-ground.html" with Partial English Translation.

"Hokkaido Satellite Co., Ltd., "Study on Freshness, and What Is the Freshness of Leafy Vegetables", Internet, [Search Date: Aug. 16, 2016], URL: http://www.hokkaido-sat.co.jp/study-archives/36-fundamental-research-fiesh.html", with Partial English Translation.

"CCS Inc., "Story About Light and Colors, and Why are Grass and Leaves Green?.", Internet, [Search Date: Aug. 16, 2016], URL: http:/www.ccs-inc.co.jp/s2_ps/sl/s_04/column/light_color/vol13.html", with Partial English Translation.

"Ito Kengo, et al., "The Independent Estimation of Vegetation Cover Rates and Vegetation Vigor using Spectruml Reflectance", The Remote Sensing Society of Japan, vol. 16, No. 4, pp. 41-49, 1996", with English Abstract.

"Aoyanagi Yoshihide, "Development of Hyper Spectruml Camera and Use of Data", Development Using Micro-Satellite Shinshu Workshop, Oct. 25, 2010, Internet, [Search Date: Aug. 16, 2016], URL: http://www.nano-sat.org/shinshu/files/2010shinshu/07_aoyanagi.pdf", with Partial English Translation.

"Satori Shin, "Research and Development of Micro-Satellite in Hokkaido", Space Policy Seminar, Sapporo, Sep. 30, 2013, Internet, [Search Date: Aug. 16, 2016], URL: http://www8.cao.go.jp/space/seminar/fy25-dai3/satori-1.pdf", with Partial Enghsh Translation.

"Endo Takahiro, "A Study on Hyperspectruml Measurement Method for the Estimation of Plant CO2 Uptake", University of Tokyo, Doctoral Dissertation, Mar. 28, 2003", with Partial English Translation.

Extended European Search Report dated Feb. 27, 2020 in corresponding European Patent Application No. 17843532.7.

Office Action dated Feb. 19, 2021 in Chinese Patent Application No. 201780026775.8, with English Translation.

Notification of Reason for Refusal dated Feb. 19, 2021 in Korean Patent Application No. 10-2018-7030578, with English Translation.

* cited by examiner

OBJECT STATE DETECTION AND TRANSMISSION SYSTEM

TECHNICAL FIELD

The present invention relates to an object state detection and transmission system that detects and transmits object states such as plant states, a spectroscopic terminal apparatus for use in the object state detection and transmission system, a control method therefor, a control program therefor, a recording medium, and a server apparatus for use in the object state detection and transmission system.

BACKGROUND ART

Conventionally, a compact spectrometer and a color meter for measuring ambient light and managing light source, etc., (hereinafter, referred to as a first conventional example) have already been on the market, and can be purchased for several hundred thousand yen, though the measurement wavelength is ranged from 380 to 780 nm (See, for example, Non-Patent Document 1).

In addition, a compact spectrometer that has a compact infrared-ray light source mounted thereon and that captures information on the freshness or quality of a crop, a food, etc., which is a measurement target, using reflected light from the light source (hereinafter, referred to as second conventional example) has also already been developed (See, for example, Non-Patent Document 2).

Further, determining the kind of a plant, deciding plant health conditions, or deciding plant raising conditions based on a spectrum of the sunlight reflected by the plant (hereinafter, referred to as third conventional example) is disclosed in, for example, Patent Documents 1 to 6.

PRIOR ART DOCUMENTS

Patent Documents

[Patent Document 1] Japanese Patent Publication No. JP_2006-314215A;
[Patent Document 2] Japanese Patent Publication No. JP_2006-317195A;
[Patent Document 3] Japanese Patent Publication No. JP_2015-077113A;
[Patent Document 4] Japanese Patent Publication No. JP_2015-223101A;
[Patent Document 5] Japanese Patent Publication No. JP_2008-076346A; and
[Patent Document 6] Japanese Patent Publication No. JP_2012-196167A.

Non-Patent Documents

[Non-Patent Document 1] SEKONIC CORPORATION, "Spectroscopic-Type Color Meter SpectroMaster C-700", Internet, [Search Date: Aug. 16, 2016], URL: http://www.sekonic.com/united-states/products/c-700/overview.aspx

[Non-Patent Document 2] SiCO, "Spectrometer", Internet, [Search Date: Aug. 16, 2016], URL: https://www.consumerphysics.com/myscio/scio

[Non-Patent Document 3] Oki Kazuo, et al., "Classification Methods for Vegetation in Urban Area using Hyperspectral Data", Eco-Engineering, 17(1), pp. 67-72, 2005.

[Non-Patent Document 4] Hokkaido Satellite Co., Ltd., "Grass and Ground, and For Photographing Target", Internet, [Search Date: Aug. 16, 2016], URL: http://www.hokkaido-sat.co.jp/casestudy-data/plant/plant-ground.html

[Non-Patent Document 5] Hokkaido Satellite Co., Ltd., "Study on Freshness, and What Is the Freshness of Leafy Vegetables", Internet, [Search Date: Aug. 16, 2016], URL: http://www.hokkaido-sat.co.jp/study-archives/36-fundamental-research-fresh.html

[Non-Patent Document 6] CCS Inc., "Story About Light and Colors, and Why are Grass and Leaves Green?.", Internet, [Search Date: Aug. 16, 2016], URL: http://www.ccs-inc.cojp/s2_ps/s1/s_04/column/light color/vol13.html

[Non-Patent Document 7] Ito Kengo, et al., "The Independent Estimation of Vegetation Cover Rates and Vegetation Vigor using Spectral Reflectance", The Remote Sensing Society of Japan, Vol. 16, No. 4, pp. 41-49, 1996

[Non-Patent Document 8] Aoyanagi Yoshihide, "Development of Hyper Spectral Camera and Use of Data", Development Using Micro-Satellite Shinshu Workshop, Oct. 25, 2010, Internet, [Search Date: Aug. 16, 2016], URL: http://www.nano-sat. org/shinshu/files/2010shinshu/07_aoyanagi.pdf

[Non-Patent Document 9] Satori Shin, "Research and Development of Micro-Satellite in Hokkaido", Space Policy Seminar, Sapporo, Sep. 30, 2013, Internet, [Search Date: Aug. 16, 2016], URL: http://www8.cao.go.jp/space/seminar/fy25-dai3/satori-1.pdf

[Non-Patent Document 10] Endo Takahiro, "A Study on Hyperspectral Measurement Method for the Estimation of Plant CO2 Uptake", University of Tokyo, Doctoral Dissertation, Mar. 28, 2003

SUMMARY OF THE INVENTION

Problems to be Solved by the Invention

However, a scheme of the first conventional example can only allow to know a spectrum, and cannot establish an organic link with other information. Thus, the scheme of the first conventional example lacks versatility. In addition, the scheme of the first conventional example merely derives a spectrum as it is, and interpretation requires professional knowledge.

On the other hand, in a scheme of the second conventional example, the measurement wavelength is limited to the wavelength of a light source mounted on a device, and is normally limited to infrared light. Hence, wavelength information that can be captured and used is limited to infrared light.

Further, in the third conventional example, the kind of a plant can be determined, plant health states can be decided, or plant raising states can be decided based on a reflectance spectrum of the sunlight reflected by the plant. However, there is a problem that information cannot be collected so as to be associated with an image showing plant states and supplementary information such as a location and a time.

An object of the present invention is to solve the above-described problems, and provide an object state detection and transmission system capable of automatically and easily determining the kind and states of an object such as a plant, by associating the kind and states of the object with the above-described supplementary information based on a reflectance spectrum of the sunlight reflected by the object.

Another object of the present invention is to provide a spectroscopic terminal apparatus for the above-described object state detection and transmission system, a control method therefor, a control program therefor, a recording medium, and a server apparatus for the above-described object state detection and transmission system.

Means for Dissolving the Problems

According to the first aspect of the present invention, there is provided an object state detection and transmission system including a spectroscope terminal apparatus, and a server apparatus. The spectroscopic terminal apparatus integrally includes a spectrometer that measures a reflectance spectrum based on reflected light reflected by a target object, and an electronic device that receives a measured reflectance spectrum. The server apparatus is connected to the spectroscopic terminal apparatus through a communication line. The electronic device includes:

photographing means that photographs the target object to capture a photographed image;

GPS means that measures a location of the target object;

sensor means that measures an azimuth and an angle of the target object;

time signal clock means that generates and outputs times of the photographing and the measurement; and communication means that transmits the photographed image, the location of the target object, the azimuth and angle of the target object, and the time of the photographing and the measurement together with the received reflectance spectrum to the server apparatus.

The electronic device is configured to:

(1) by the sensor means, capture information on an azimuth and an angle, which specify an incident azimuth of the sunlight;

(2) by the GPS means, capture location information required to derive a solar angle, and capture time information by the time signal clock means;

(3) associate photographed image data captured by the photographing means with a time captured by the time signal clock means;

(4) collect reflectance spectrum data at a plurality of azimuths and angles for a target object by simultaneously measuring the solar angle and the incident azimuth of sunlight that are used upon measurement;

(5) capture the collected reflectance spectrum data as measurement data for a predetermined bidirectional reflectance distribution function; and (6) execute a type and state determination process for the target object by converting the collected reflectance spectrum data into reflectance spectrum data at a desired azimuth and angle, using the bidirectional reflectance distribution function.

In the above-mentioned object state detection and transmission system, the target object is a plant, an animal, a crop, medical matter, a mineral, or a food.

In addition, in the above-mentioned object state detection and transmission system, the electronic device is a smartphone.

Further, in the above-mentioned object state detection and transmission system, the photographing means is mounted on a satellite instead of on the electronic device, and the satellite wirelessly transmits the photographed image to the server apparatus.

According to the second aspect of the present invention, there is provided a spectroscopic terminal apparatus integrally including a spectrometer that measures a reflectance spectrum based on reflected light reflected by a target object, and an electronic device that receives a measured reflectance spectrum.

The electronic device includes:

photographing means that photographs the target object to capture a photographed image;

GPS means that measures a location of the target object;

sensor means that measures an azimuth and an angle of the target object;

time signal clock means that generates and outputs times of the photographing and the measurement; and communication means that transmits the photographed image, the location of the target object, the azimuth and angle of the target object, and the time of the photographing and the measurement together with the received reflectance spectrum to the server apparatus.

The electronic device is configured to:

(1) by the sensor means, capture information on an azimuth and an angle, which specify an incident azimuth of the sunlight;

(2) by the GPS means, capture location information required to derive a solar angle, and capture time information by the time signal clock means;

(3) associate photographed image data captured by the photographing means with a time captured by the time signal clock means;

(4) collect reflectance spectrum data at a plurality of azimuths and angles for a target object by simultaneously measuring the solar angle and the incident azimuth of sunlight that are used upon measurement;

(5) capture the collected reflectance spectrum data as measurement data for a predetermined bidirectional reflectance distribution function; and (6) execute a type and state determination process for the target object by converting the collected reflectance spectrum data into reflectance spectrum data at a desired azimuth and angle, using the bidirectional reflectance distribution function.

In the above-mentioned spectroscopic terminal apparatus, the target object is a plant, an animal, a crop, medical matter, a mineral, or a food.

In addition, in the above-mentioned spectroscopic terminal apparatus, the electronic device is a smartphone.

In addition, in the above-mentioned spectroscopic terminal apparatus, the photographing means is mounted on a satellite instead of on the electronic device, and the satellite wirelessly transmits the photographed image to the server apparatus.

According to the third aspect of the present invention, there is provided a control method for an electronic device for use in a spectroscopic terminal apparatus integrally including a spectrometer that measures a reflectance spectrum based on reflected light reflected by a target object, and the electronic device that receives a measured reflectance spectrum.

The electronic device includes:

photographing means that photographs the target object to capture a photographed image;

GPS means that measures a location of the target object;

sensor means that measures an azimuth and an angle of the target object;

time signal clock means that generates and outputs times of the photographing and the measurement; and communication means that transmits the photographed image, the location of the target object, the azimuth and angle of the target object, and the time of the photographing and the measurement together with the received reflectance spectrum to the server apparatus, The control method includes the steps of:

controlling the photographing means to photograph the target object to capture the photographed image;

controlling the GPS means to measure the location of the target object;

controlling the sensor means to measure the azimuth and the angle of the target object; and controlling the communication means to transmit the photographed image, the location of the target object, the azimuth and angle of the target object, and the time of the photographing and the measurement together with the received reflectance spectrum to the server apparatus.

The control method further includes the steps of:

(1) by the sensor means, capturing information on an azimuth and an angle, which specify an incident azimuth of the sunlight;

(2) by the GPS means, capturing location information required to derive a solar angle, and capturing time information by the time signal clock means;

(3) associating photographed image data captured by the photographing means with a time captured by the time signal clock means;

(4) collecting reflectance spectrum data at a plurality of azimuths and angles for a target object by simultaneously measuring the solar angle and the incident azimuth of sunlight that are used upon measurement;

(5) capturing the collected reflectance spectrum data as measurement data for a predetermined bidirectional reflectance distribution function; and (6) executing a type and state determination process for the target object by converting the collected reflectance spectrum data into reflectance spectrum data at a desired azimuth and angle, using the bidirectional reflectance distribution function.

According to the fourth aspect of the present invention, there is provided a control program including respective steps of the above-mentioned control method, where the respective steps are executed by the electronic device.

According to the fifth aspect of the present invention, there is provided a computer-readable recording medium that stores the above-mentioned control program.

According to the sixth aspect of the present invention, there is provided a server apparatus for use in the above-mentioned object state detection and transmission system. The server apparatus executes a type and decision process for a target object after receiving a photographed image, a location of the target object, an azimuth and an angle of the target object, times of photographing and measurement, and a reflectance spectrum that are transmitted from an electronic device.

In the above-mentioned server apparatus, the server apparatus is a terminal apparatus connected to a communication line.

Effect of the Invention

Therefore, according to the object state detection and transmission system according to the present invention, the kind and states of a target object can be automatically and easily determined by associating the kind and states of the target object with the above-described supplementary information based on a reflectance spectrum of the sunlight reflected by the target object.

MODE FOR CARRYING OUT THE INVENTION

Figure 1:
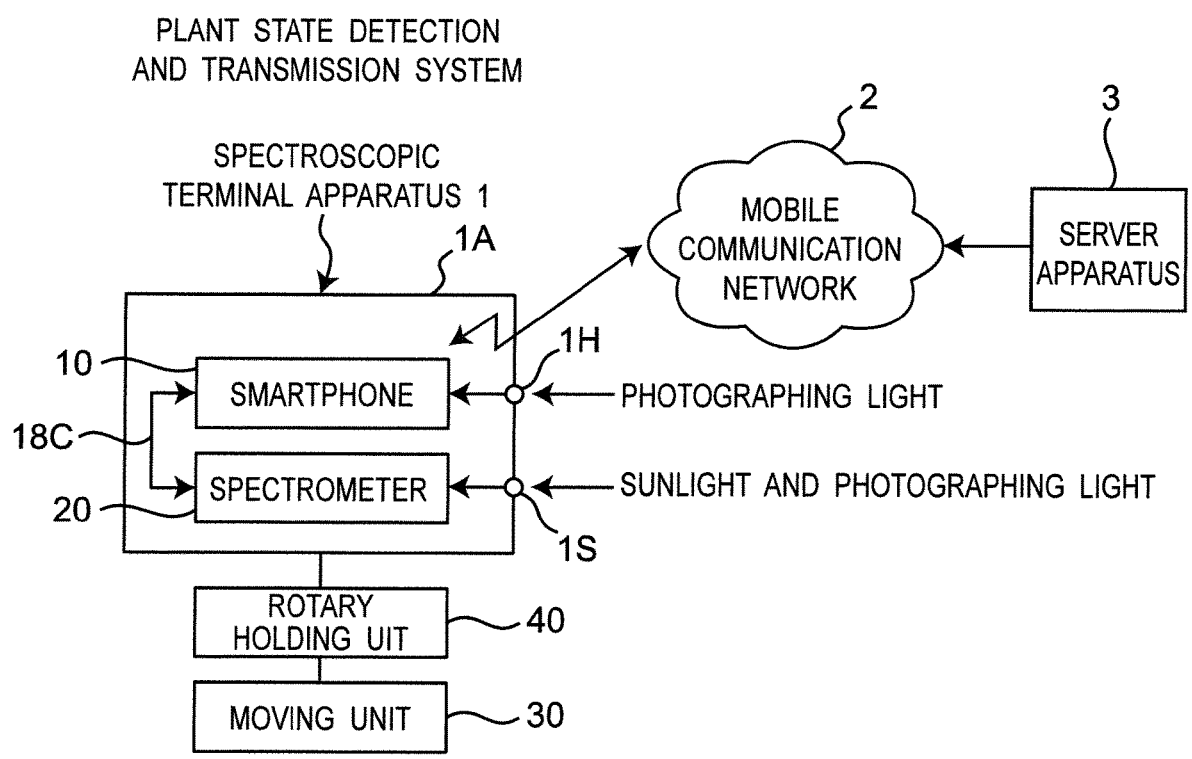
FIG. 1 is a block diagram showing an exemplary configuration of a plant state detection and transmission system according to one embodiment of the present invention.

Embodiments according to the present invention will be described below with reference to the drawings. Note that, in the following embodiments, like components are denoted by the same reference characters.

FIG. 1 is a block diagram showing an exemplary configuration of a plant state detection and transmission system according to one embodiment of the present invention. Referring to FIG. 1, the plant state detection and transmission system is configured to include a spectroscopic terminal apparatus 1 and a server apparatus 3 which are connected to each other through a mobile communication network 2 and are integrated. In this case, the spectroscopic terminal apparatus 1 is configured to include a smartphone 10, and a spectrometer 20, which are provided in an apparatus casing 1A, and which are connected to each other by a USB cable 18C.

Figure 3:
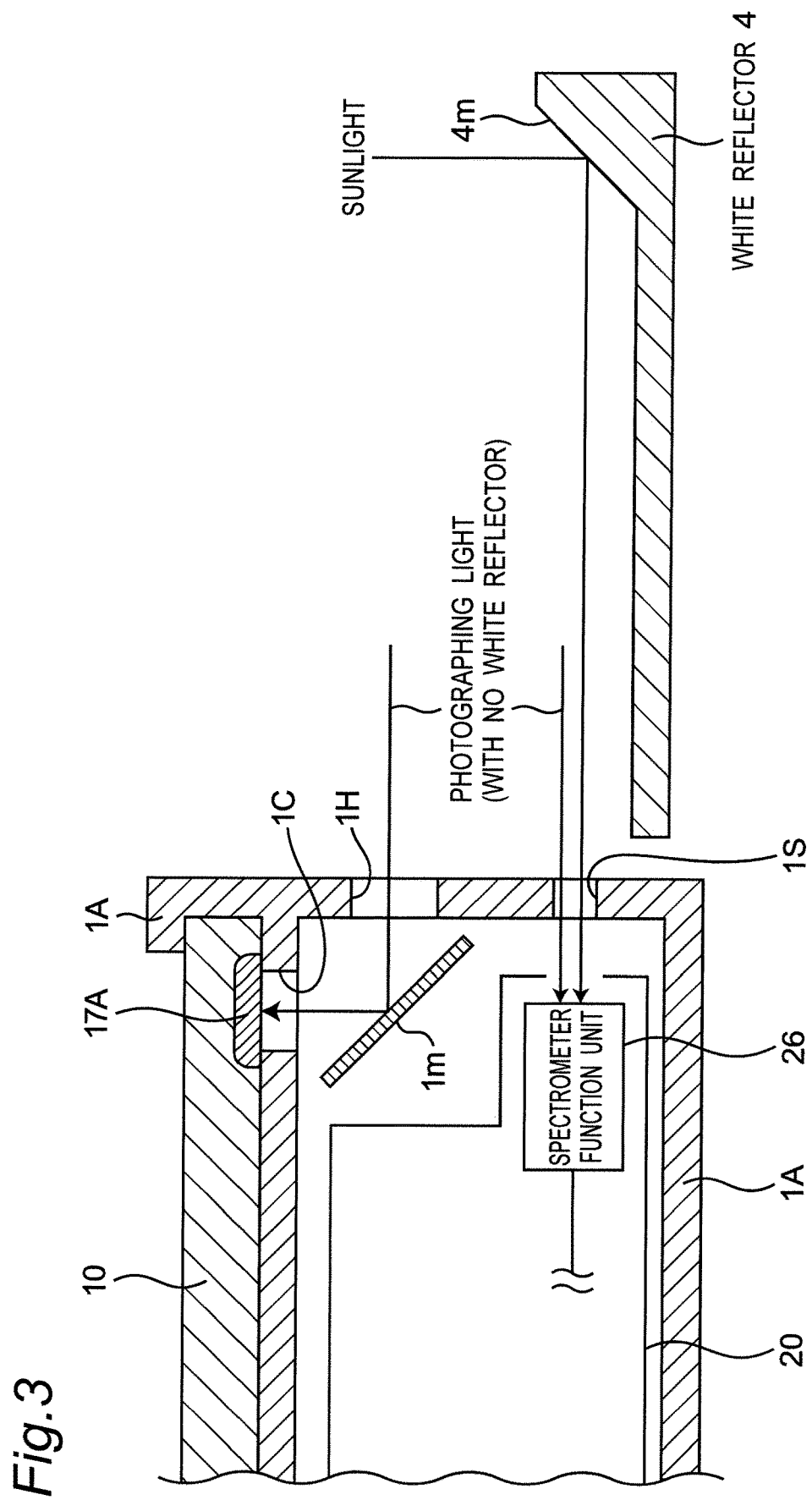
FIG. 3 is a vertical cross-sectional view showing a disposition relationship between a spectroscopic terminal apparatus 1 of FIG. 1 and a white reflector 4 for when the spectroscopic terminal apparatus 1 measures an incident spectrum and a reflectance spectrum, and showing an exemplary configuration of the spectroscopic terminal apparatus 1.

The spectrometer 20 measures an incident spectrum which is a reference spectrum by receiving, through a slit 1S, direct sunlight from the sun (note that in practice, it is sunlight reflected by a white reflector 4 as shown in FIG. 3), and sends the incident spectrum to the smartphone 10 through the USB cable 18C, and measures a reflectance spectrum which is a measured spectrum by receiving, through the slit 1S, reflected light which is reflected by a target plant 5 from the sun, and sends the reflectance spectrum to the smartphone 10. The smartphone 10 executes a plant state detection and transmission process of FIG. 4 to set an appropriate S/N ratio and exposure value based on the incident spectrum, and then receives the reflectance spectrum and photographs a photographed image of the target plant 5 through a hole 1H, and stores these photographed image data and reflectance spectrums such that they are associated with supplementary information including a current location, an azimuth θ based on the geomagnetism (a geomagnetic azimuth with true north being the reference that uses a geomagnetic sensor), an inclination angle φ relative to a horizontal plane, and a measurement time, and then transmits the photographed image data, the reflectance spectrum, and the supplementary information to the server apparatus 3 through the mobile communication network 2. The server apparatus 3 receives these data, and executes a type and state determination process for the target plant 5, as will be described in detail later.

In this case, the spectroscopic terminal apparatus 1 includes, as shown in FIG. 1, a rotary holding unit 40 that holds the spectroscopic terminal apparatus 1 in a rotatable manner; and a moving unit 30 that allows the spectroscopic terminal apparatus 1 and the rotary holding unit 40 to move in a linear or curved manner.

Figure 16:
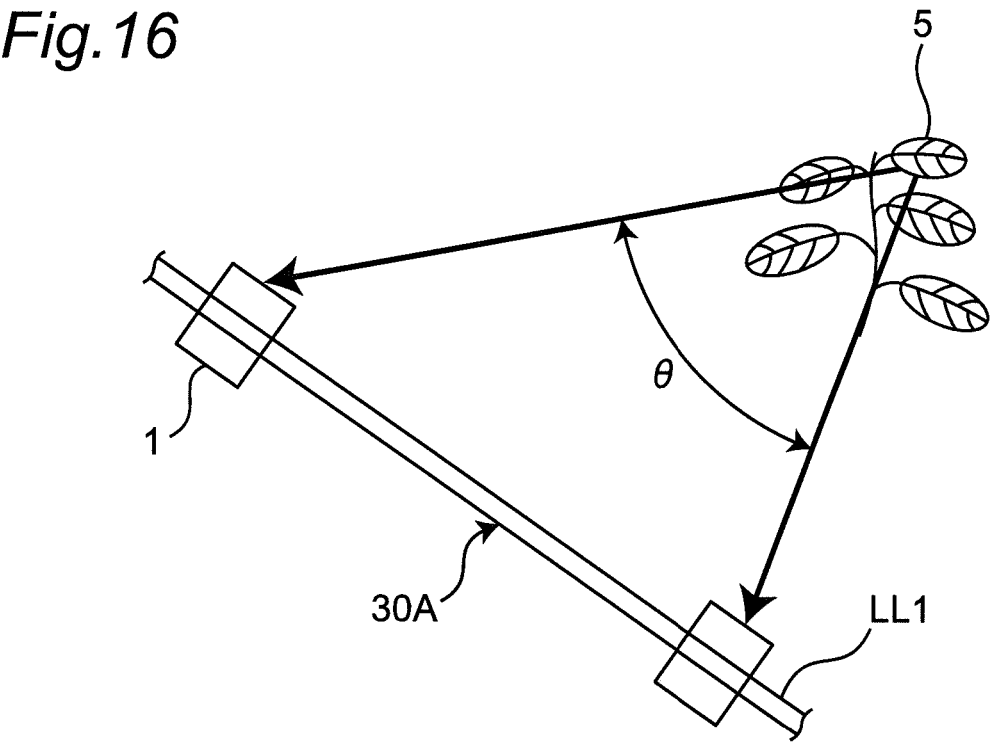
FIG. 16 is a perspective view showing a measurement example in which an azimuth θ is measured by allowing the spectroscopic terminal apparatus 1 to move using a linear rail LL1.

FIG. 16 is a perspective view showing a measurement example in which an azimuth θ is measured by allowing the spectroscopic terminal apparatus 1 to move using a linear rail LL1. FIG. 16 shows an example of a moving unit 30A that can change the azimuth θ by allowing the spectroscopic terminal apparatus 1 to move along the linear rail LL1 provided on the ground, for example.

Figure 17:
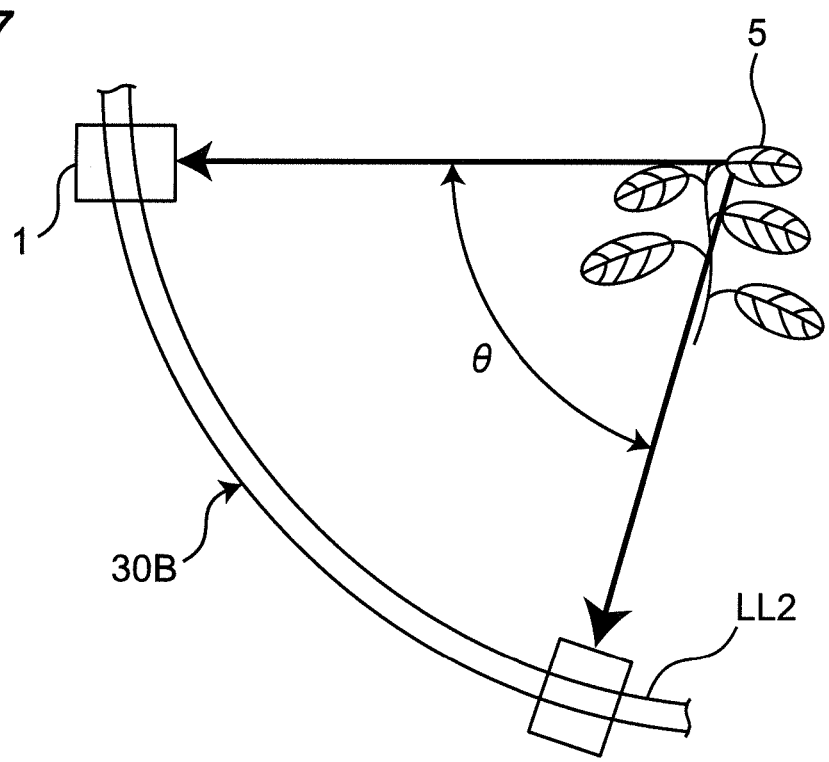
FIG. 17 is a perspective view showing a measurement example in which the azimuth θ is measured by allowing the spectroscopic terminal apparatus 1 to move using a curved rail LL2.

FIG. 17 is a perspective view showing a measurement example in which the azimuth θ is measured by allowing the spectroscopic terminal apparatus 1 to move using a curved rail LL2. FIG. 17 shows an example of a moving unit 30B that can change the azimuth θ by allowing the spectroscopic terminal apparatus 1 to move along the curved rail LL2 provided on the ground or provided such that both ends are fixed on the ground, for example.

Figure 2:
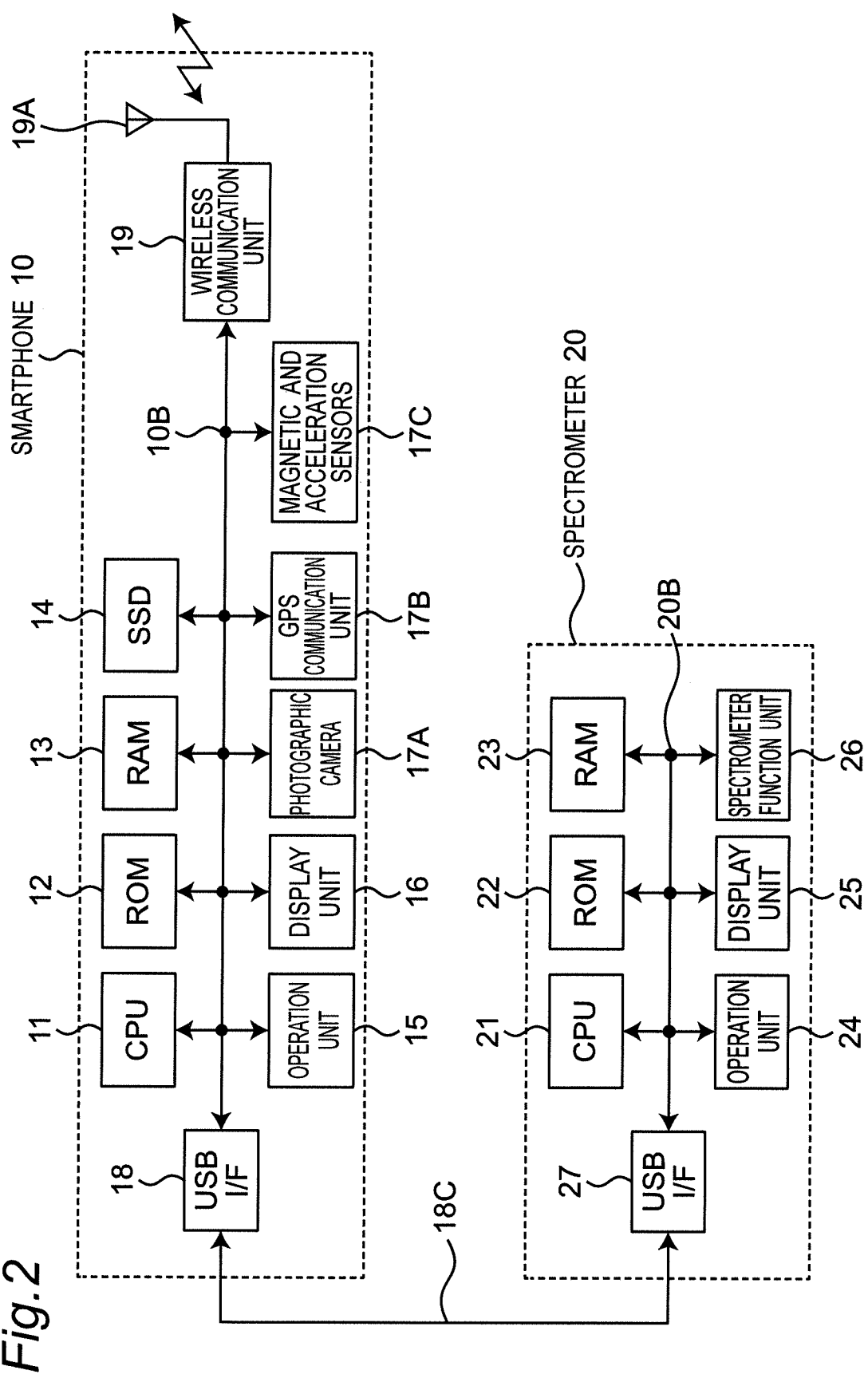
FIG. 2 is a block diagram showing an exemplary detailed configuration of a smartphone 10 and a spectrometer 20 of FIG. 1.

FIG. 2 is a block diagram showing an exemplary detailed configuration of the smartphone 10 and the spectrometer 20 of FIG. 1.

Referring to FIG. 2, the spectrometer 20 includes the following components, which are connected to each other through a bus 20B:

(1) CPU 21 that controls the operation of the spectrometer 20;

(2) ROM 22 that stores an operating system (OS) program and application programs which are executed by the CPU 21, and data required to execute them;

(3) RAM 23 that temporarily stores data that is, for example, calculated or measured when the above-described programs are executed;

(4) an operation unit 24 that includes a keyboard, etc., for setting, by a measurer, the operation of the spectrometer 20;

(5) a display unit 25 that displays, for example, measurement data such as a spectrum which is measured when the spectrometer 20 operates;

(6) a spectrometer function unit 26 that is controlled by the CPU 21, and measures an incident spectrum based on incident light, measures a reflectance spectrum based on reflected light, and outputs data of measurement results; and (7) a USB interface (USB I/F) 27 that transmits data of the incident spectrum and reflectance spectrum measured by the spectrometer function unit 26, to the smartphone 10 through the USB cable 18C and a USB interface 18.

Figure 4:
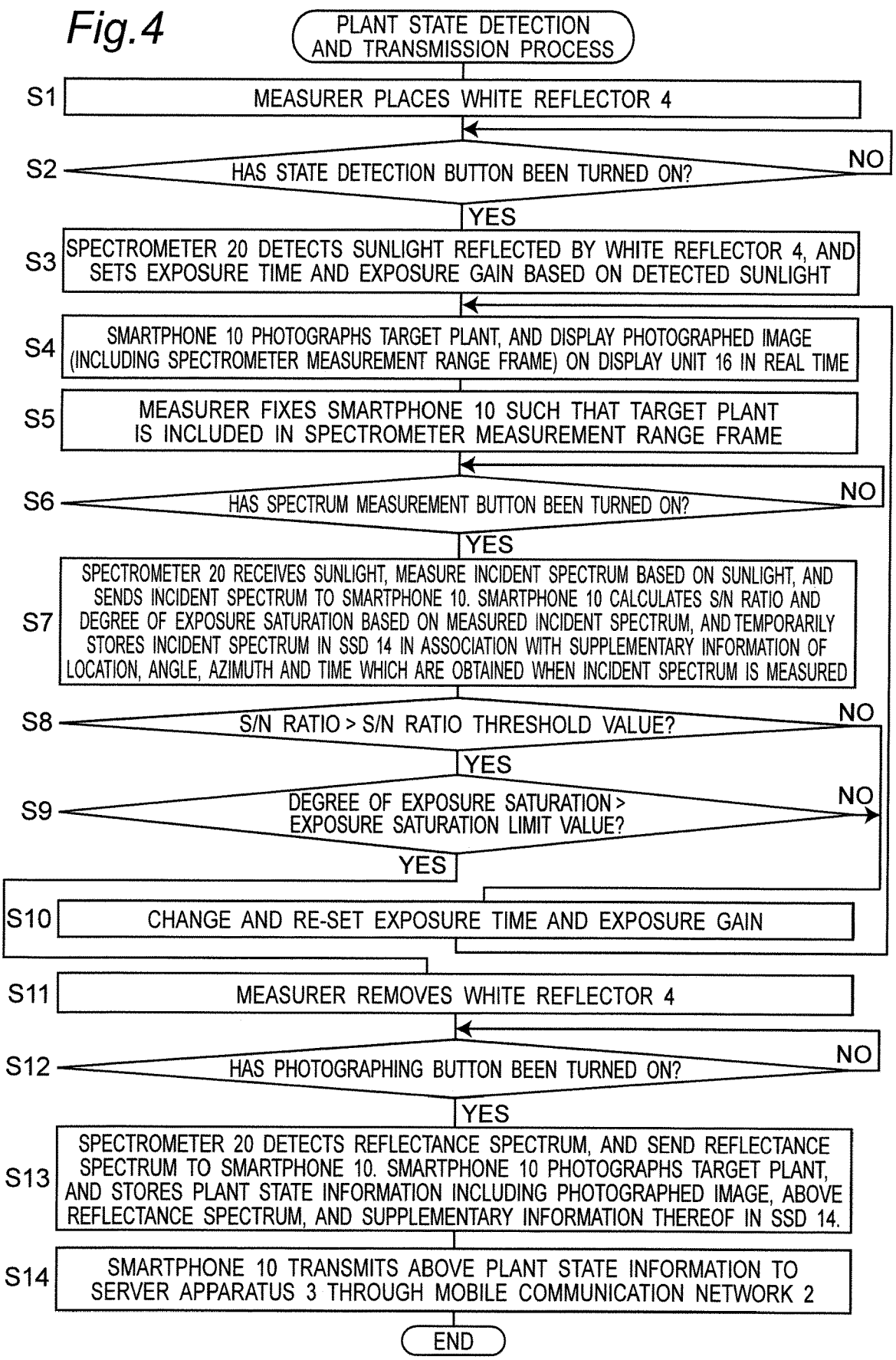
FIG. 4 is a flowchart showing a plant state detection and transmission process which is executed by the smartphone 10 of FIG. 1.

In addition, the smartphone 10 includes the following components, which are connected to each other through a bus 10B:

(1) CPU 11 that controls the operation of the smartphone 10, and includes a time signal clock circuit that generates and outputs a time signal of a current time;

(2) ROM 12 that stores an operating system (OS) program and application programs which are executed by the CPU 11, and data required to execute them;

(3) RAM 13 that temporarily stores data that is, for example, calculated or measured when the above-described programs are executed;

(4) SSD 14 that temporarily stores application programs which are executed by the CPU 11, data required to execute them, and data that is, for example, calculated or measured;

(5) an operation unit 15 that includes a keyboard, etc., for setting, by the measurer, the operation of the smartphone 10;

(6) a display unit 16 that displays measurement data such as a spectrum which is measured when the smartphone 10 operates, photographed data, operating buttons, etc., where the operating buttons are, for example, a touch panel on the display unit 16, and include a state detection button (which is turned on when the white reflector 4 is placed), a spectrum measurement button, a photographing button, etc., which are used in the plant state detection and transmission process of FIG. 4, and operate as the operation unit 15;

(7) a photographic camera 17A that photographs the target plant 5 and outputs data of a photographed image;

(8) a GPS communication unit 17B that measures and outputs a local location of the smartphone 10 using a publicly known GPS system;

(9) magnetic and acceleration sensors 17C that measures an azimuth θ by a magnetic sensor, measures an inclination angle φ by an acceleration sensor, and outputs data of measurement results;

(10) a USB interface (USB I/F) 18 that receives, through the USB cable 18C, data of the incident spectrum and reflectance spectrum measured by the spectrometer function unit 26, and outputs the data to the CPU 11; and

(11) a wireless communication unit 19 that modulates a radio signal according to data in which the photographed image data and the reflectance spectrum are associated with supplementary information including the current location, the azimuth θ based on the geomagnetism, the inclination angle φ relative to the horizontal plane, and the measurement time, and wirelessly transmits the modulated radio signal to the server apparatus 3 using an antenna 19A through the mobile communication network 2;

FIG. 3 is a vertical cross-sectional view showing a disposition relationship between the spectroscopic terminal apparatus 1 of FIG. 1 and the white reflector 4 for when the spectroscopic terminal apparatus 1 measures an incident spectrum and a reflectance spectrum, and showing an exemplary configuration of the spectroscopic terminal apparatus 1. Referring to FIG. 3, the smartphone 10 and the spectrometer 20 are integrally accommodated in the apparatus casing 1A to configure the spectroscopic terminal apparatus 1.

The slit 1S and the hole 1H are made in a side surface of the apparatus casing 1A of the spectroscopic terminal apparatus 1. In addition, a hole 1C is made in a portion of the apparatus casing 1A between the spectrometer 20 and the smartphone 10, and a reflector 1m that reflects photographing light through the hole 1H is provided immediately below the hole 1C.

(1) When an incident spectrum is measured, the measurer places the white reflector 4 as shown in FIG. 3, by which sunlight is reflected by a reflecting surface 4m of the white reflector 4 and then enters a light-receiving unit of the spectrometer function unit 26 through the slit 1S, and an incident spectrum is measured.

(2) When a reflectance spectrum is measured, the measurer removes the white reflector 4, and reflected light (photographing light) of the sunlight that is reflected by the target plant 5 enters the light-receiving unit of the spectrometer function unit 26 through the slit 1S, and a reflectance spectrum is measured. In addition, reflected light (photographing light) of the sunlight is reflected by the reflector 1m through the hole 1H, and then received by the photographic camera 17A through the hole 1C, by which a photographed image of the target plant 5 is photographed.

FIG. 4 is a flowchart showing a plant state detection and transmission process which is executed by the smartphone 10 of FIG. 1. A program for the following plant state detection and transmission process can be formed, for example, as an application program of the smartphone 10, and the application program can be provided through a communication line or provided stored in a computer-readable recording medium such as a CD-ROM or a DVD-ROM.

At step S1 of FIG. 4, the measurer places the white reflector 4, and at step S2, it is determined whether the state detection button has been turned on. If YES, processing proceeds to step S3. On the other hand, if NO, processing returns to step S2. At step S3, the spectrometer 20 detects sunlight reflected by the white reflector 4, and sets exposure time and exposure gain based on the detected sunlight. Then, at step S4, the smartphone 10 photographs the target plant 5 using the photographic camera 17A, and thereby photographs a photographed image (including a spectrometer measurement range frame), and displays the photographed image on the display unit 16 in real time. At step S5, the measurer fixes the smartphone 10 such that the target plant 5 is included in the spectrometer measurement range frame, and at step S6, it is determined whether the spectrum measurement button has been turned on. If YES, processing proceeds to step S7. On the other hand, if NO, processing returns to step S6.

At step S7, the spectrometer 20 receives sunlight, measures an incident spectrum based on the sunlight, and sends the incident spectrum to the smartphone 10. Based on the measured incident spectrum, an S/N ratio and the degree of exposure saturation are calculated by a publicly known method. The smartphone 10 temporarily stores the incident spectrum in the SSD 14 such that the incident spectrum is associated with supplementary information on a location, an angle, an azimuth, and a time which are captured when the incident spectrum is measured. Then, at step S8, it is determined whether the measured S/N ratio is greater than a predetermined S/N ratio threshold value. If YES, processing proceeds to step S9. On the other hand, if NO, processing proceeds to step S10. In addition, at step S9, it is determined whether the measured degree of exposure saturation is greater than a predetermined exposure saturation limit value. If YES, processing proceeds to step S11. On the other hand, if NO, processing proceeds to step S10. At step S10, the exposure time and the exposure gain are changed and re-set, and then processing returns to step S4.

At step S11, the measurer removes the white reflector 4, and at step S12, it is determined whether the photographing button has been turned on. If YES, processing proceeds to step S13. On the other hand, if NO, processing returns to step S12. At step S13, the spectrometer 20 detects a reflectance spectrum and sends the reflectance spectrum to the smartphone 10, and the smartphone 10 photographs the target plant 5 and stores, in the SSD 14, plant state information (hereinafter, referred to as plant state information) including a photographed image, the reflectance spectrum, and supplementary information thereof. Further, at step S15, the smartphone 10 transmits the plant state information to the server apparatus 3 through the mobile communication network 2, and ends the plant state detection and transmission process.

Further, the server apparatus 3 executes the following "plant type and state decision process" using a publicly known method and based on the received plant state information, and stores results thereof in a storage apparatus in the server apparatus 3, and sends back the results to the smartphone 10 to display the results on the display unit 16.

(1) Plant kind determination process (See, for example, Patent Documents 3 and 6 and Non-Patent Documents 3, 5, 8, and 9)

(2) Plant health state determination process (See, for example, Patent Documents 1, 2, 4, and 5 and Non-Patent Documents 5, 6, 8, and 9)

(3) Plant pathogenic nematode determination process (See, for example, Non-Patent Documents 5, 8, and 9)

(4) Plant raising stage determination process (see, for example, Patent Documents 1, 2, 4, and 5 and Non-Patent Documents 5, 7, 8, and 9)

(5) Plant contamination state determination process (See, for example, Non-Patent Documents 5, 8, and 9) (such as the level of Pb contamination, etc.)

(6) Determination process for the amount of $CO_2$ absorbed by a plant (See, for example, Non-Patent Documents 5, 8, 9, and 10)

Further, examples of supplementary information and a plant type and state decision process on the smartphone 10 will be described below.

Figure 5:
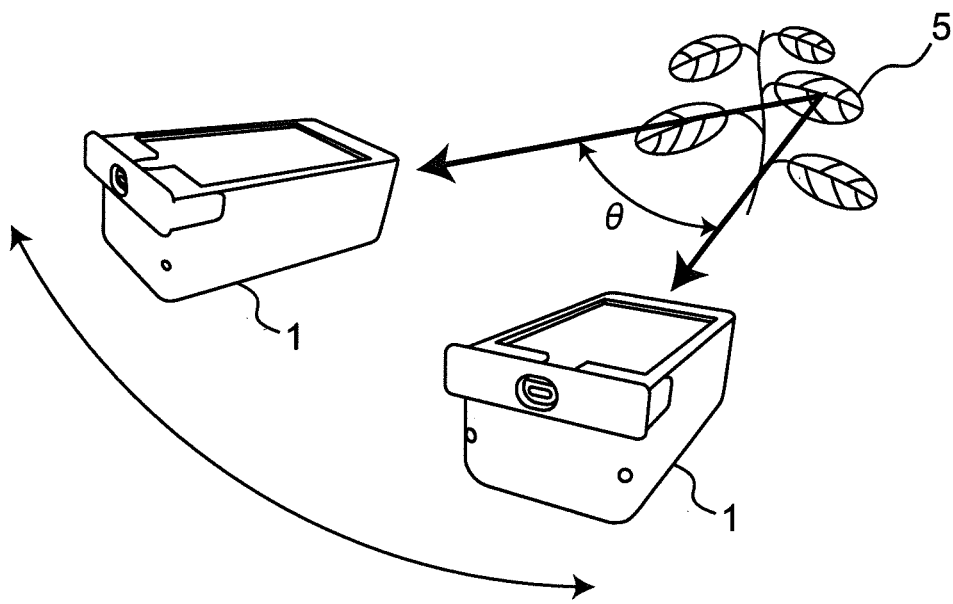
FIG. 5 is an external perspective view showing a measurement example in which an azimuth θ of the spectroscopic terminal apparatus 1 of FIG. 1 is measured.

FIG. 5 is an external perspective view showing a measurement example in which the azimuth θ of the spectroscopic terminal apparatus 1 of FIG. 1 is measured. As shown in FIG. 5, the azimuth θ for each location with the target plant 5 being at the center (a geomagnetic azimuth with true north being the reference that uses a geomagnetic sensor) can be measured by a geomagnetic sensor in the magnetic and acceleration sensors 17C.

Figure 6:
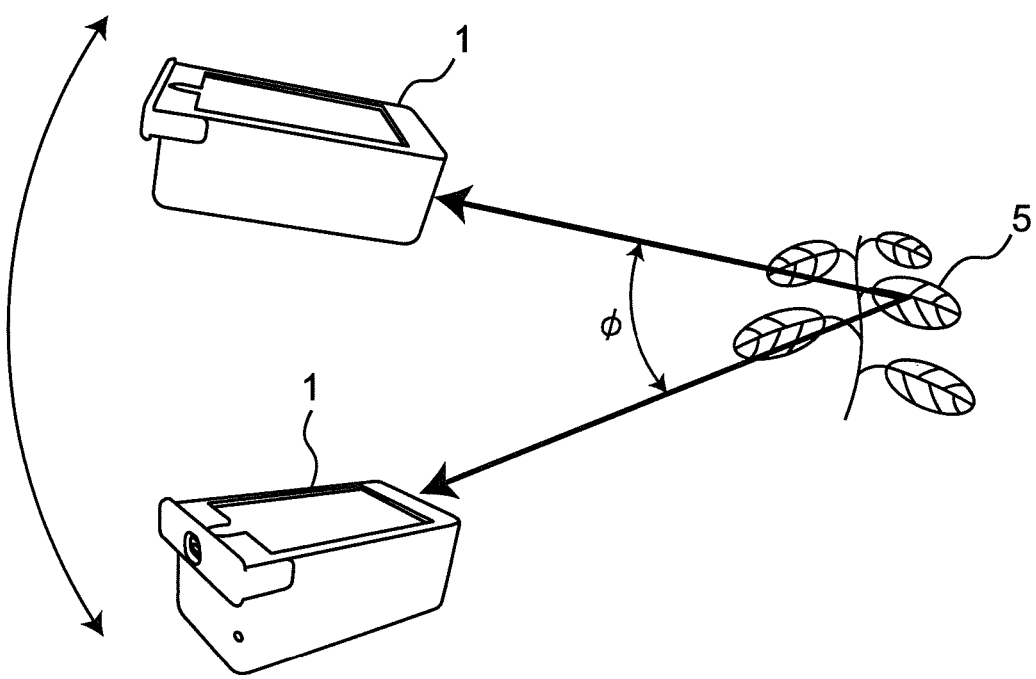
FIG. 6 is an external perspective view showing a measurement example in which an inclination angle ϕ of the spectroscopic terminal apparatus 1 of FIG. 1 is measured.

FIG. 6 is an external perspective view showing a measurement example in which an inclination angle φ of the spectroscopic terminal apparatus 1 of FIG. 1 is measured. As shown in FIG. 6, the inclination angle φ with respect to a horizontal plane with the target plant 5 being at the center can be measured.

Figure 7:
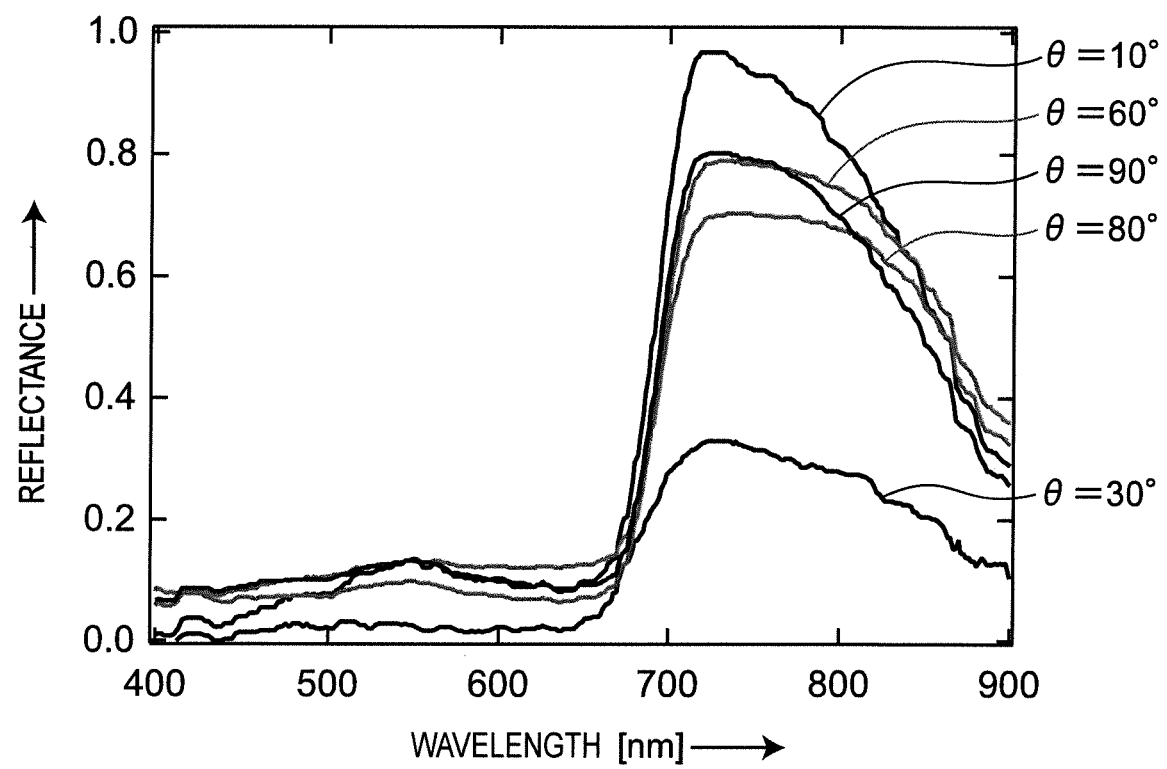
FIG. 7 is a graph showing a measurement example of reflectance spectrum for when the azimuth θ of FIG. 5 is used as a parameter.

FIG. 7 is a graph showing a measurement example of reflectance spectrum for when the azimuth θ of FIG. 5 is used as a parameter. As shown in FIG. 7, it can be seen that the reflectance spectrum of a plant changes depending on the azimuth θ. In particular, the azimuth θ can be specified particularly in a wavelength range of 500 to 650 nm and 700 to 820 nm in the reflectance spectrum.

Figure 8:
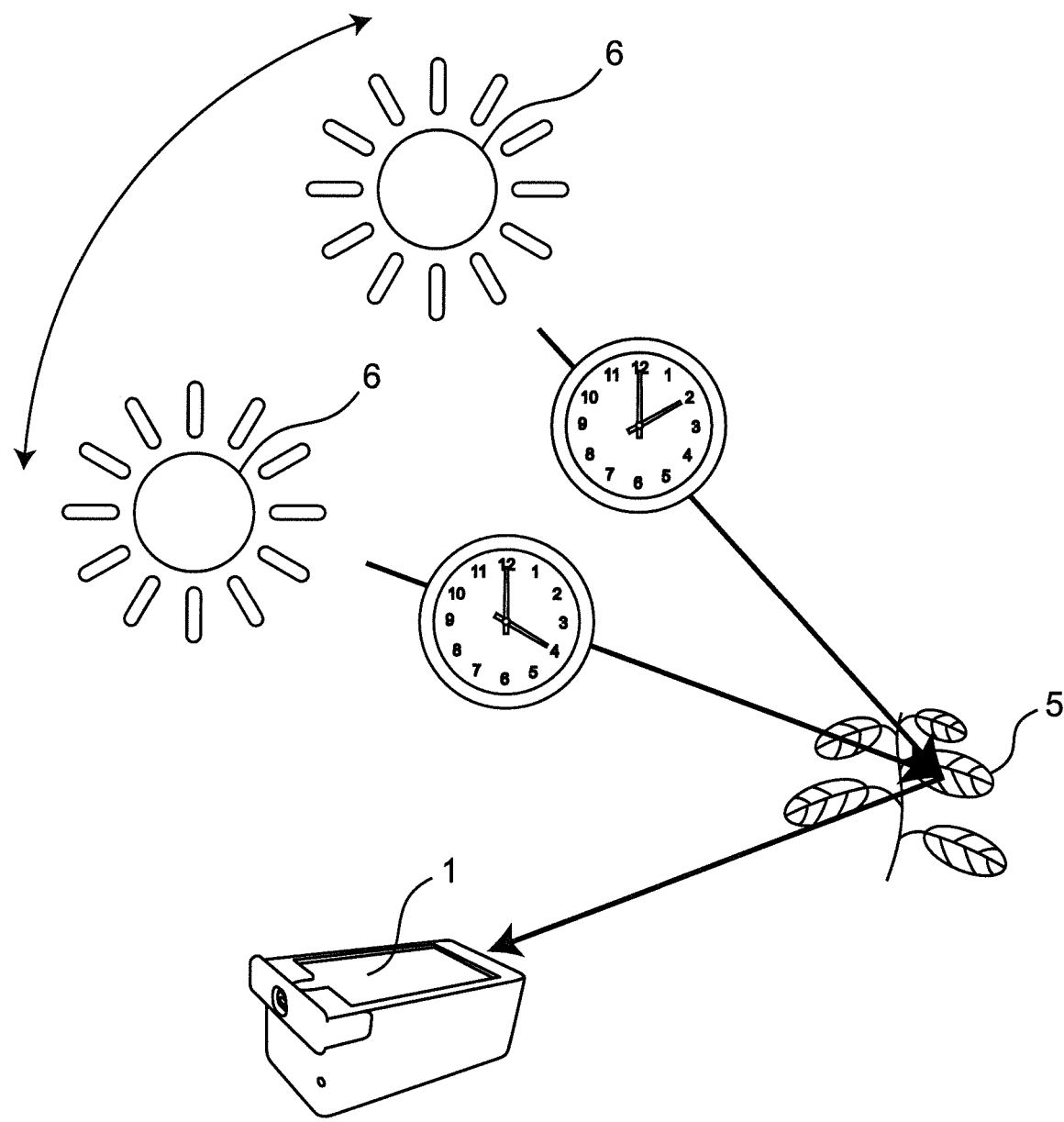
FIG. 8 is an external perspective view showing a measurement example of a reflectance spectrum for a time change, using the spectroscopic terminal apparatus 1 of FIG. 1 when the sun 6 moves.
Figure 9:
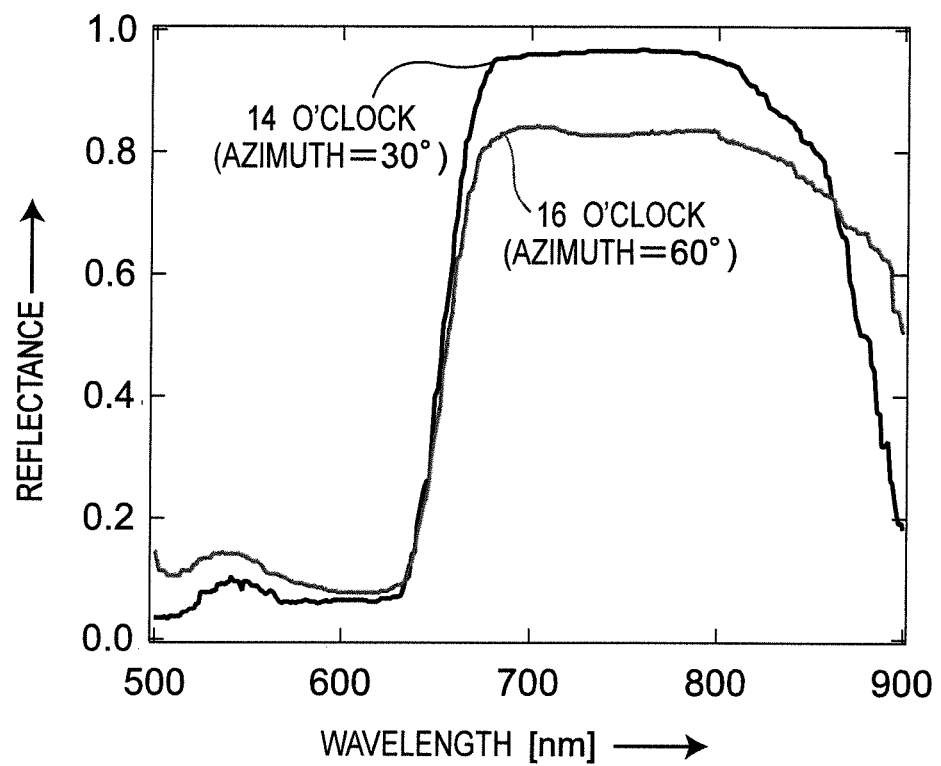
FIG. 9 is a graph showing a measurement example of reflectance spectrum for when the time of FIG. 8 is used as a parameter.

FIG. 8 is an external perspective view showing a measurement example of a reflectance spectrum for a time change, using the spectroscopic terminal apparatus 1 of FIG. 1 when the sun 6 moves, and FIG. 9 is a graph showing a measurement example of reflectance spectrum for when the time of FIG. 8 is used as a parameter. As shown in FIGS. 8 and 9, for example, for the position of the sun at 14 o'clock and the position of the sun at 16 o'clock, the azimuth of the sunlight can be specified particularly in a wavelength range of 500 to 650 nm and 750 to 850 nm in the reflectance spectrum.

Figure 10A:
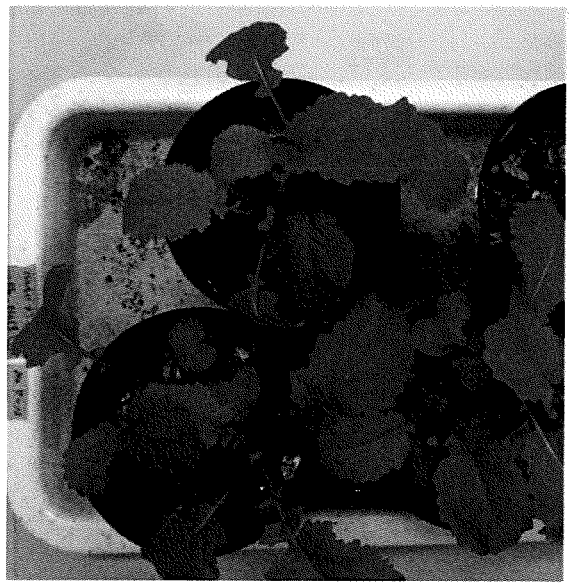
FIG. 10A is a picture image showing a photographed image of target plants which shows an example of the raising of the plants under lead contamination.
Figure 10B:
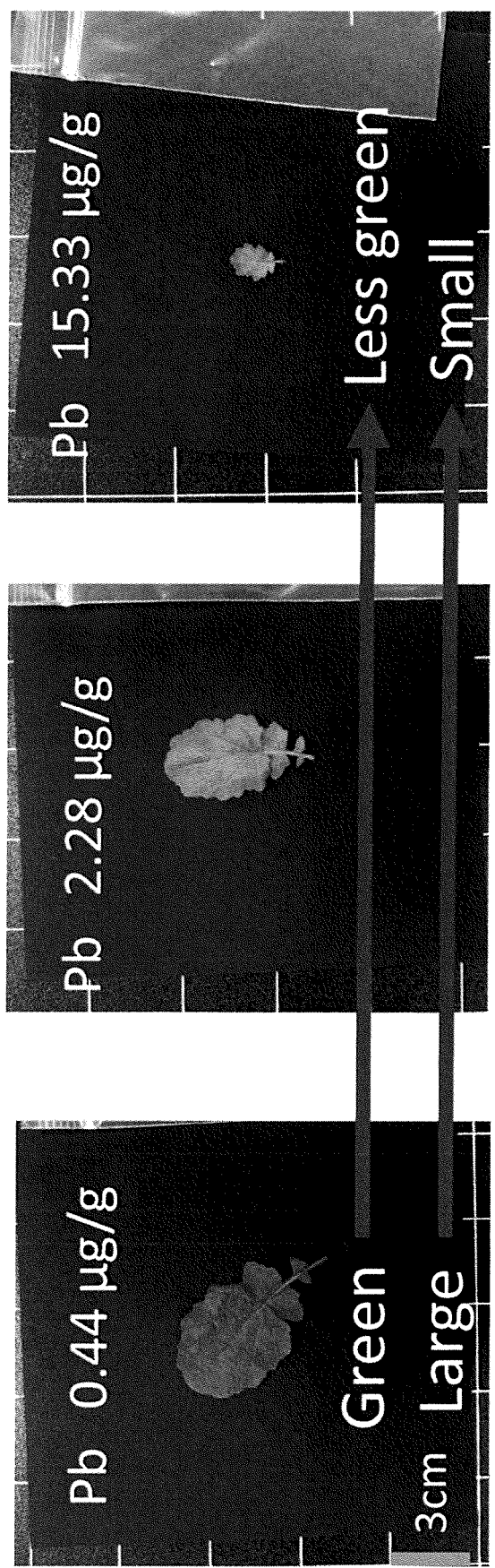
FIG. 10B is picture images showing photographed images of target plants which show changes in the raising of the plants for changes in lead content and which are an example of the raising of the plants under lead contamination.
Figure 10C:
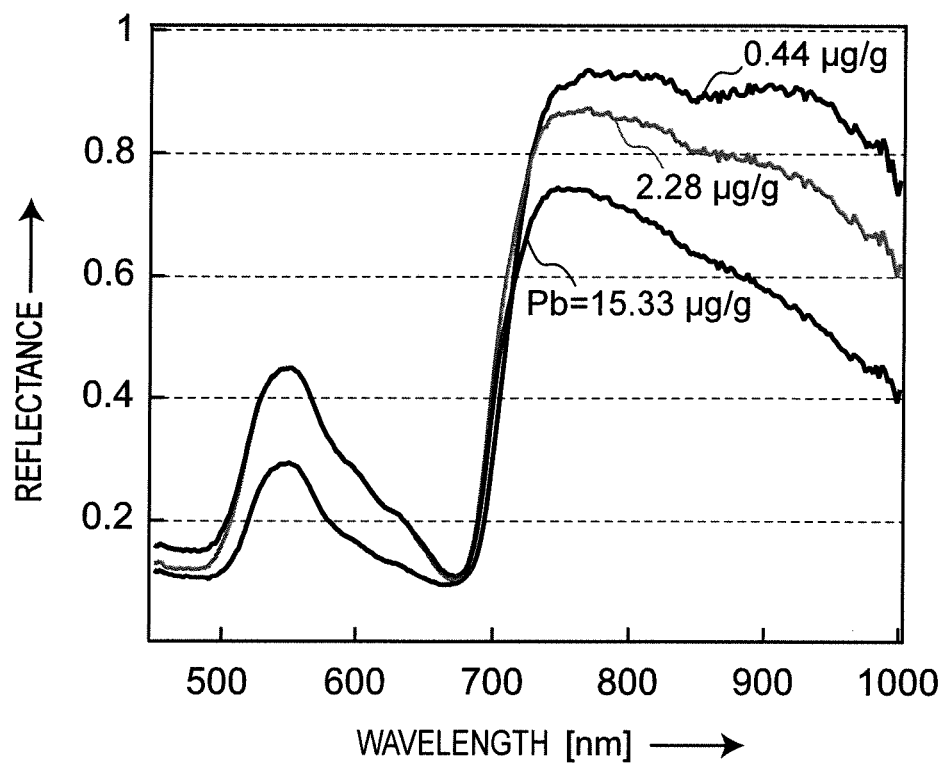
FIG. 10C is a graph showing a measurement example of reflectance spectrum for when the lead content of FIG. 10B is used as a parameter.

FIG. 10A is a picture image showing a photographed image of target plants which shows an example of the raising of the plants under lead contamination, FIG. 10B is picture images showing photographed images of target plants which show changes in the raising of the plants for changes in lead content and which are an example of the raising of the plants under lead contamination, and FIG. 10C is a graph showing a measurement example of reflectance spectrum for when the lead content of FIG. 10B is used as a parameter. As shown in FIG. 10B, the larger the lead content, the worse (smaller) the plant growth states become, and the color of the plant also changes from green to light green. In addition, as shown in FIG. 10C, the lead content can be specified particularly in a wavelength range of 500 to 650 nm and 730 to 1000 nm in the reflectance spectrum.

Figure 11:
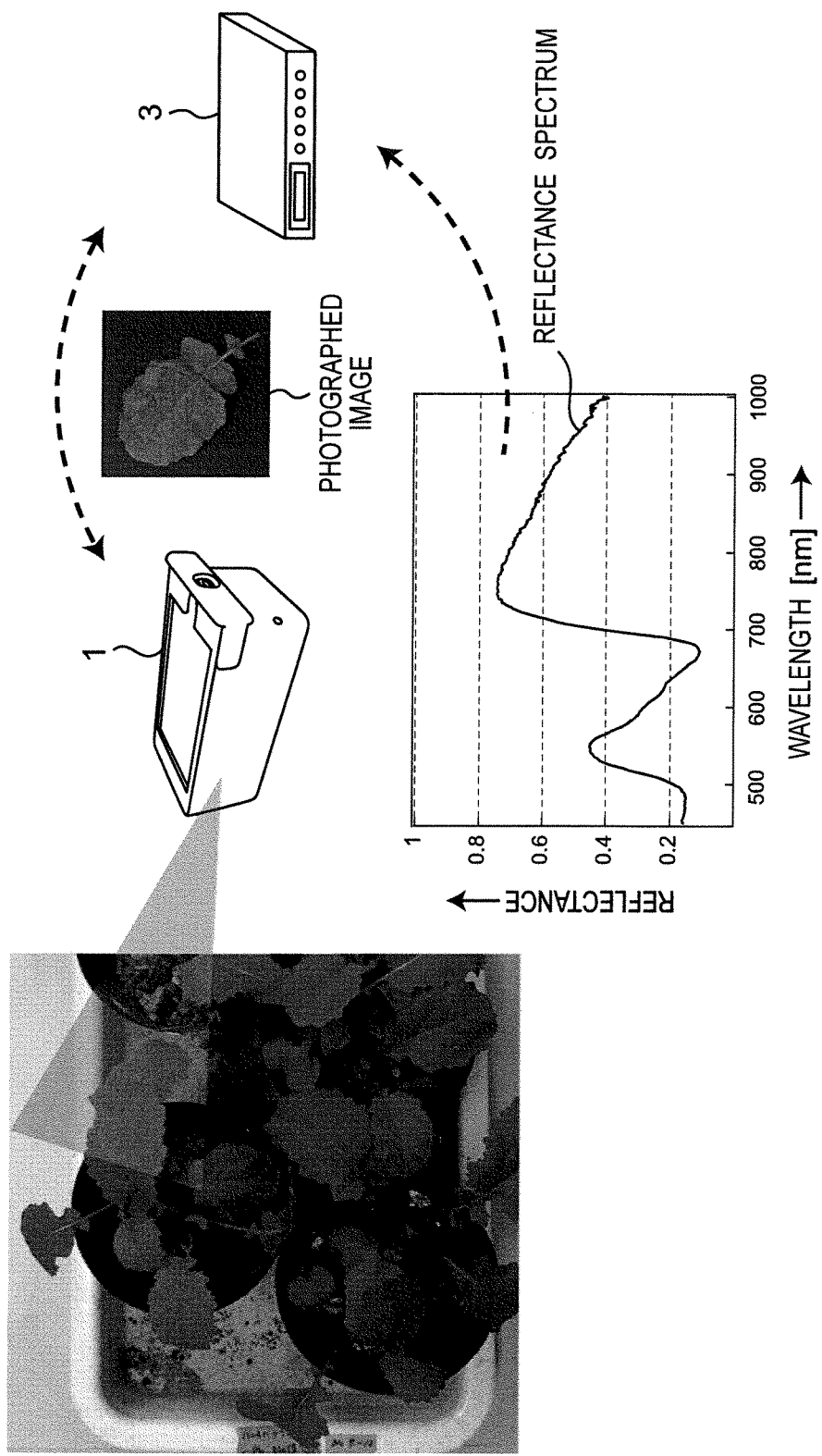
FIG. 11 is a diagram showing an image of utilization of a camera function of the smartphone 10 in the plant state detection and transmission system of FIG. 1.

FIG. 11 is a diagram showing an image of utilization of a camera function of the smartphone 10 in the plant state detection and transmission system of FIG. 1. As shown in FIG. 11, the spectroscopic terminal apparatus 1 including the smartphone 10 transmits data of a photographed image with supplementary information to the server apparatus 3; on the other hand, a reflectance spectrum measured by the spectrometer 20 is transmitted to the server apparatus 3 through the smartphone 10, and then, these pieces of data are associated with each other and stored in the server apparatus 3 in an integrated manner, and then the server apparatus 3 can executes a "plant type and state decision process".

Figure 12A:
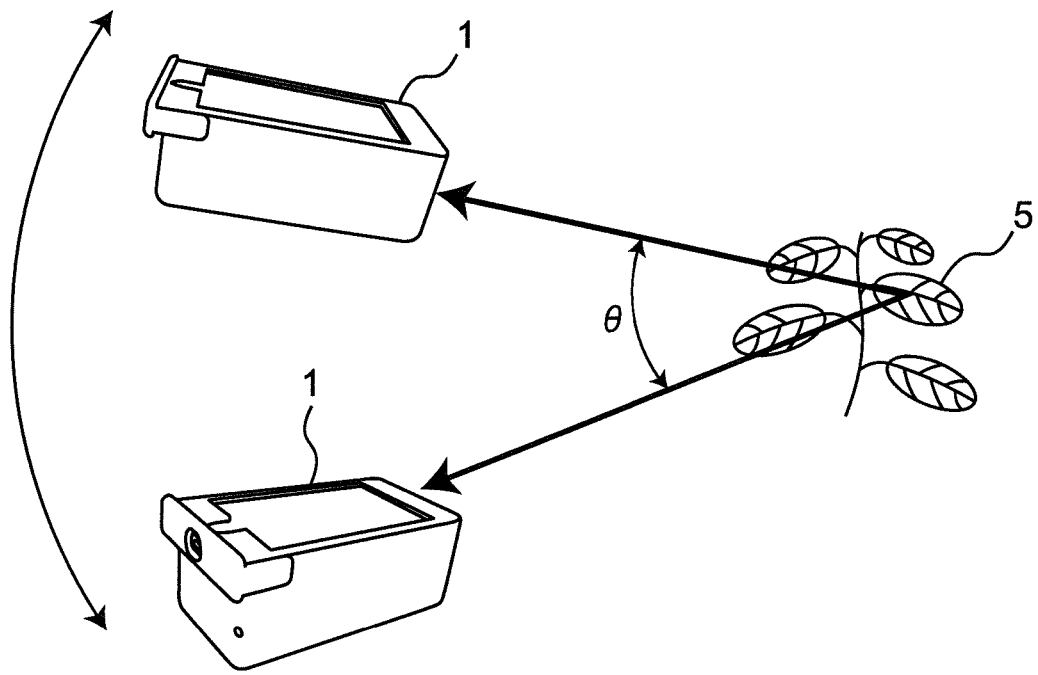
FIG. 12A is an external perspective view showing a measurement example in which the azimuth θ of the spectroscopic terminal apparatus 1 of FIG. 1 is measured.
Figure 12B:
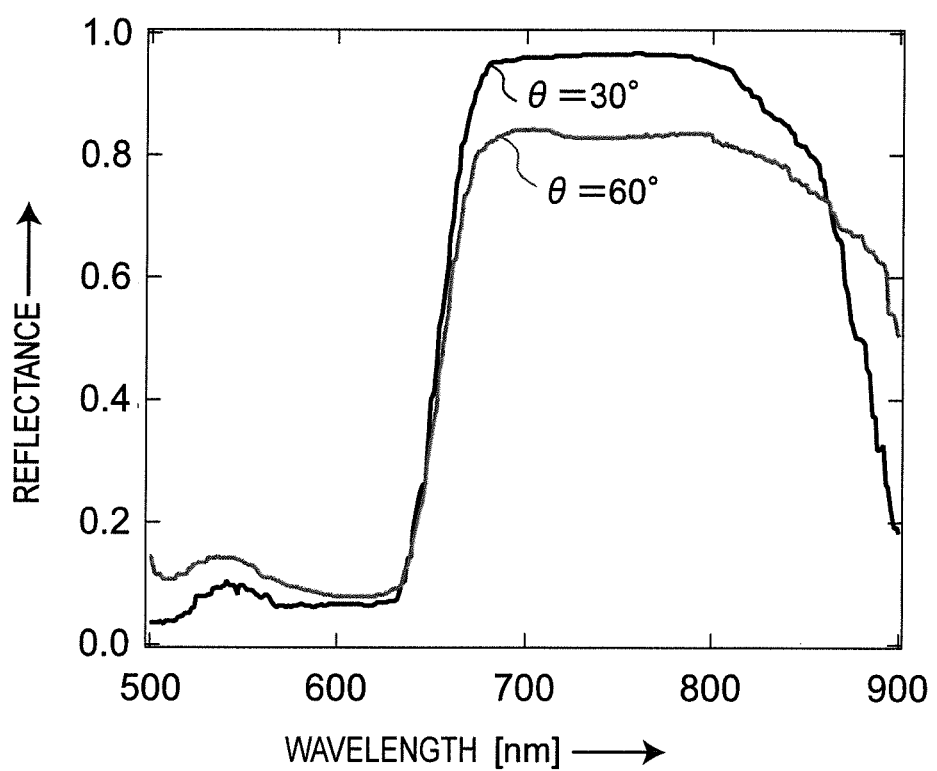
FIG. 12B is a graph showing a measurement example of reflectance spectrum for when the azimuth θ of FIG. 12A is used as a parameter.

FIG. 12A is an external perspective view showing a measurement example in which the azimuth θ of the spectroscopic terminal apparatus 1 of FIG. 1 is measured, and FIG. 12B is a graph showing a measurement example of reflectance spectrum for when the azimuth θ of FIG. 12A is used as a parameter. As shown in FIGS. 12A and 12B, the reflectance spectrum can be specified such that the reflectance spectrum changes particularly in a range of 500 to 650 nm and 670 to 850 nm, depending on the azimuth θ.

Figure 13:
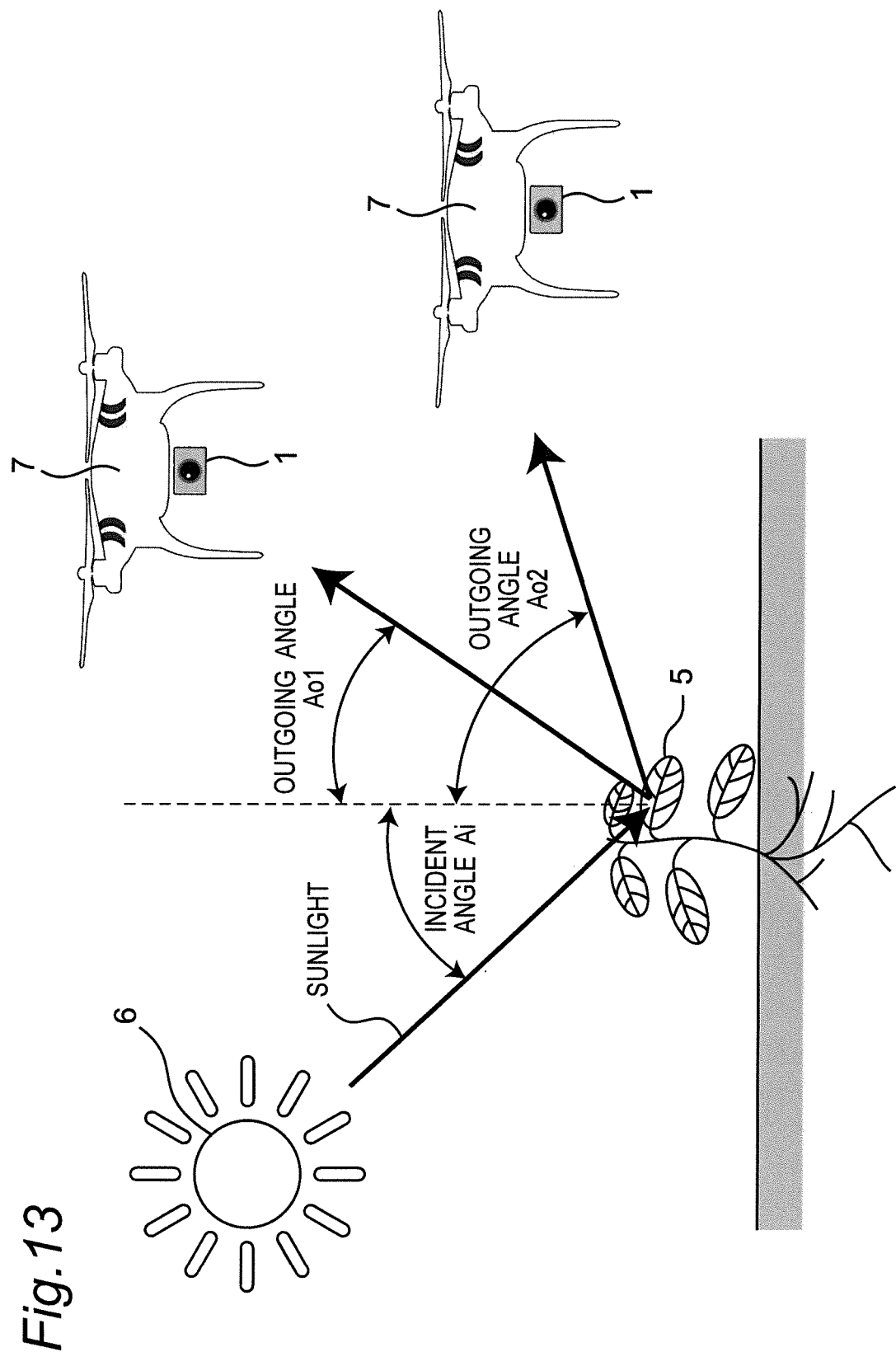
FIG. 13 is a schematic diagram showing an exemplary application for when the spectroscopic terminal apparatus 1 is mounted on a drone 7.

FIG. 13 is a schematic diagram showing an exemplary application for when the spectroscopic terminal apparatus 1 is mounted on a drone 7. In FIG. 13, although an incident angle Ai from the sun 6 to a target plant 5 is constant, by allowing the spectroscopic terminal apparatus 1 to move using the drone 7 including the spectroscopic terminal apparatus 1, outgoing angles Ao1 and Ao2 are changed, enabling to measure the above-described reflectance spectrum.

Figure 14:
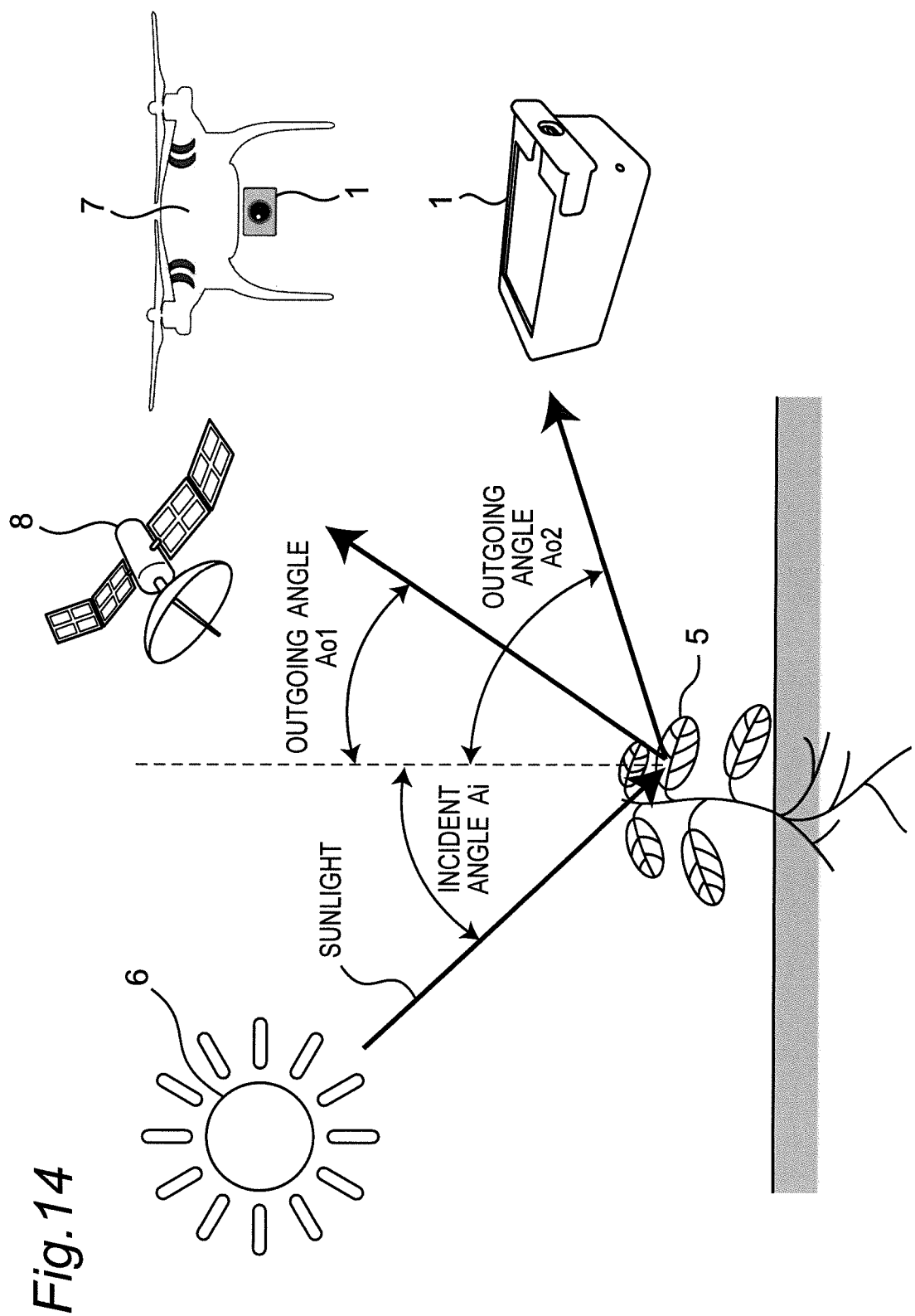
FIG. 14 is an external perspective view showing an example of the organic coupling and complementary use of an image photographed by a satellite 8, data captured by a spectroscopic terminal apparatus 1, and data captured by a spectroscopic terminal apparatus 1 mounted on a drone 7.

FIG. 14 is an external perspective view showing an example of the organic coupling and complementary use of an image photographed by a satellite 8, data captured by a spectroscopic terminal apparatus 1, and data captured by a spectroscopic terminal apparatus 1 mounted on a drone 7. As shown in FIG. 14, the satellite 8 photographs a photographed image of a target plant 5, the spectroscopic terminal apparatus 1 on the drone 7 and another spectroscopic terminal apparatus 1 measure plant state information on the target plant 5, and the pieces of plant state information are transmitted to the server apparatus 3, by which all pieces of plant state information are collected and a "plant type and state decision process" can be executed.

As described above, in the present embodiment, the magnetic and acceleration sensors 17C mounted on the smartphone 10 capture an azimuth θ and an angle φ, and the GPS communication unit 17B mounted on the smartphone 10 captures a location, the azimuth θ, the angle φ, and the location being recorded so as to be associated with a reflectance spectrum. In addition, a photographic camera function and a time which are mounted on the smartphone 10 as standard equipment are also associated. By collecting reflectance spectrum data at every azimuth θ and every angle φ for a target plant, a bidirectional reflectance distribution function (BRDF) of the following equation can be captured as actual measurement data.

The bidirectional reflectance distribution function (hereinafter, referred to as BRDF) is a function representing a ratio showing how much light is reflected in direction $\omega_r$ when light enters from a given direction $\omega_i$ at a given location x, and is represented by the following equation:

$$f_r(x, \vec{\omega}_i, \vec{\omega}_r) = \frac{dL_r(x, \vec{\omega}_r)}{dE_i(x, \vec{\omega}_i)} \quad (1)$$

In this case, when it is assumed that incident light is reflected by an object surface, the entry of the incident light into an object is not considered, and the light is reflected by a uniform material, BRDF can be written as $f_r(\omega_i, \omega_r)$, ignoring the location x.

If a time is known, then a solar angle used upon measurement is known, and an incident azimuth of the sunlight hitting a plant, a fruit, or the like, whose reflectance spectrum is measured is known from the magnetic and acceleration sensors 17C. In this case, for the derivation of the solar angle, location (the latitude and longitude of an observation location) information is used with the time, and both are captured by the GPS communication unit 17B on the smartphone 10. By simultaneously measuring the above-described solar angle and incident azimuth of the sunlight that are used upon measurement, conversion of a reflectance spectrum into a reflectance spectrum at a desired azimuth θ and angle φ becomes possible, enabling to execute a "plant type and state decision process" including plant kind and health state determination, harmful insect determination, contamination state decision, and raising stage decision which are originally known.

In addition, since a satellite image is originally such that an area near the ground is measured from directly above, conversion to a reflectance spectrum captured by a satellite image or comparison between reflectance spectrum captured by satellite images can be executed. The photographic camera 17A mounted on the smartphone 10 is essential also to check a spectrum measurement region, and by photographing a picture, associating the picture with a spectrum, and tagging the picture and the spectrum, information such as kind determination and color can be known in a real-space manner. In addition, since the spectrometer 20 and the smartphone 10 are structured to be integrated, the above-described simultaneous measurement becomes possible. Thus, the above-described simultaneous measurement cannot be executed if the smartphone 10 and the spectrometer 20 are separated from each other.

Figure 15:
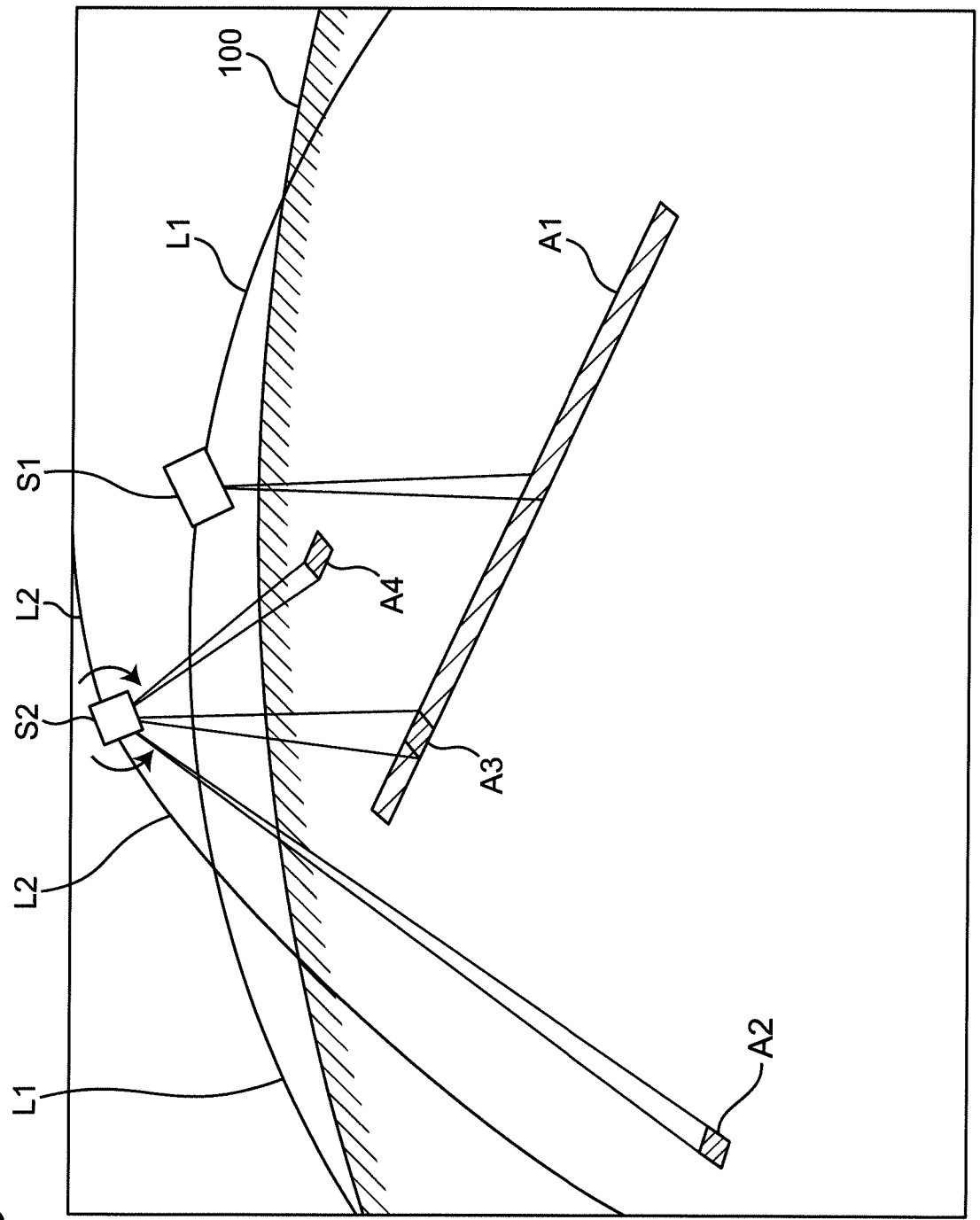
FIG. 15 is a perspective view for describing a difference between a measurement example of a conventional example and a measurement example according to the embodiment.

FIG. 15 is a perspective view for describing a difference between a measurement example of a conventional example and a measurement example according to the embodiment. In FIG. 15, in the conventional example, using an orbiting satellite S1 that goes around an orbit L1, object states such as plant states, in, for example, a strip-shaped region A1 with a predetermined width are measured. In this case, since measurement needs to be executed a plurality of times in a range of a desired predetermined region on the surface of the Earth, using the region A1 as a unit, there is a problem that the number of measurement and a measurement region become enormous.

On the other hand, in the present embodiment, when object states such as plant states are measured sequentially in, for example, regions A2, A3, and A4 having a predetermined area, using an orbiting satellite S2 that goes around an orbit L2 and that includes the rotary holding unit 40, information is collected in advance in the above-described manner and stored in the server apparatus 3. By executing conversion using the information in the server apparatus 3 and using the above-described bidirectional reflectance distribution function, desired data can be measured such that time cost and processing cost are significantly reduced compared to the conventional example.

Specifically, it is characterized in that using an electronic device such as the smartphone 1, the following steps are executed:

(1) capturing information on an azimuth and an angle, which specify an incident azimuth of the sunlight, by sensor means such as magnetic and acceleration sensors, (2) capturing location information by GPS means such as the GPS communication unit 17B, and capturing time information by clock means, where the location information is required to derive a solar angle, (3) associating photographed image data captured by photographing means such as the photographic camera 17A with a time captured by the time signal clock means, (4) collecting reflectance spectrum data at a plurality of azimuths and angles for a target object, by simultaneously measuring the solar angle and the incident azimuth of the sunlight that are used upon measurement, (5) capturing the collected reflectance spectrum data as measurement data for the above-described bidirectional reflectance distribution function, and (6) executing a type and state determination process for a target object, by converting the collected reflectance spectrum data into reflectance spectrum data at a desired azimuth and angle, using the bidirectional reflectance distribution function.

By this, according to the object state detection and transmission system according to the present invention, the kind and states of a target object such as a plant can be automatically and easily determined by associating the kind and states of the target object with the above-described supplementary information based on a reflectance spectrum of the sunlight reflected by the target object.

Summary of the Embodiments

The plant state detection and transmission system according to the present embodiment is the same as prior art in terms of the compact spectrometer 20, but has the following features of the invention:

(1) While a wavelength range from visible light to near-infrared light is covered by measuring a spectrum at multiple wavelengths of 380 to 1050 nm, spectrum information can be captured which is organically linked to a measured angle and azimuth information which are captured by using the magnetic and acceleration sensors 17C attached to the smartphone 10, and location information captured by the GPS communication unit 17B.

(2) The captured spectrum information is tagged with a picture of a target which is photographed using the photographic camera 17A attached to the smartphone 10 and with the location information captured by the GPS communication unit 17B in addition to the above-described angle and azimuth information, and is saved in an external database in the server apparatus 3, etc.

(3) The compact spectrometer 20 according to the present embodiment can measure all wavelength range of 380 to 1050 nm and thus can be naturally multifunctional. Reflectance spectrum for all objects on Earth such as animals and plants, crops, medical matter, minerals, and foods can be tagged with the above-described angle and azimuth information, and uploaded to the external database in the server apparatus 3, etc. This is essential information particularly in that a relationship between the incident angle of the sunlight and the orientation of an object can be identified outdoors, and the ability to record the information provides an extremely great effect. By processing a measured spectrum according to a measurer's wish, a service can also be introduced in which not only the degree of growth and harvest time of crops, but also the health performance of animals and plants outdoors can be easily grasped.

(4) Further, by using the above-described system in cooperation with the drone 7, information that is limited to measurement of a reflectance spectrometry from one location on the ground with the smartphone 10 can be grasped from up in the sky. At that time, the cooperation between a measured angle and azimuth information which are captured using the magnetic and acceleration sensors 17C and further location information captured by the GPS communication unit 17B and the normal photographic camera 17A becomes one and only measurement data for interpretation of a reflectance spectrum using sunlight outdoors.

As described above, according to the plant state detection and transmission system according to the present embodiment, the kind and states of a plant can be automatically and easily determined by associating the kind and states of the plant with the above-described supplementary information based on a reflectance spectrum of the sunlight reflected by the plant.

Modified Embodiments

Although, in the above embodiment, plant state data is transmitted using the mobile communication network 2, the present invention is not limited thereto, and the transmission may be executed using communication lines such as other wireless communication networks or wired communication networks.

Although, in the above embodiment, the smartphone 10 is used, the present invention is not limited thereto, and an electronic device such as a personal computer or a mobile phone may be used.

Although, in the above embodiment, the smartphone 10 and the spectrometer 20 are connected to each other using the USB interfaces 18 and 27, the present invention is not limited thereto, and they may be connected using other communication interfaces.

Although, in the above embodiment, the server apparatus 3 executes a plant type and state determination process, the present invention is not limited thereto, and another terminal apparatus such as the smartphone 10 or a personal computer may execute the process.

Although, in the above embodiment, the server apparatus 3 collects various data and executes a type and state determination process for the target plant 5, the present invention is not limited thereto, and a terminal apparatus such as an electronic device (including the smartphone 10) which is connected to the mobile communication network 2 may execute the process.

Although, in the above embodiment, a type and state determination process for the target plant 5 is executed, the present invention is not limited thereto, and a target is not limited to plants and may be all objects on Earth such as animals, crops, medical matter, minerals, and foods. In this case, a type and state determination process for a target object can be executed based on a reflectance spectrum.

INDUSTRIAL APPLICABILITY

As described in detail above, according to the object state detection and transmission system according to the present invention, the kind and states of a target object such as a plant can be automatically and easily determined by associating the kind and states of the target object with the above-described supplementary information based on a reflectance spectrum of the sunlight reflected by the target object.

DESCRIPTION OF REFERENCE CHARACTERS

1: SPECTROSCOPIC TERMINAL APPARATUS
1A: APPARATUS CASING
1C and 1H: HOLE
1S: SLIT
2: MOBILE COMMUNICATION NETWORK
3: SERVER APPARATUS
4: WHITE REFLECTOR
4m: REFLECTING SURFACE
5: TARGET PLANT
6: SUN
7: DRONE
8: SATELLITE
10: SMARTPHONE
10B: BUS
11: CPU
12: ROM
13: RAM
14: SSD
15: OPERATION UNIT
16: DISPLAY UNIT
17A: PHOTOGRAPHIC CAMERA
17B: GPS COMMUNICATION UNIT
17C: MAGNETIC AND ACCELERATION SENSORS
18: USB INTERFACE (USB I/F)
18C: USB CABLE
19: WIRELESS COMMUNICATION UNIT
19A: ANTENNA
20: SPECTROMETER
20B: BUS
21: CPU
22: ROM
23: RAM
24: OPERATION UNIT
25: DISPLAY UNIT
26: SPECTROMETER FUNCTION UNIT
27: USB INTERFACE (USB I/F)
30, 30A, and 30B: MOVING UNIT
40: ROTARY HOLDING UNIT
100: HORIZON LINE
A1 to A4: MEASUREMENT REGION
L1 and L2: ORBIT
LL1 and LL2: RAIL
S1 and S2: ORBITING SATELLITE

The invention claimed is:

1. An object state detection and transmission system comprising:
a spectroscopic terminal apparatus integrally including a spectrometer configured to measure a reflectance spectrum based on reflected light reflected by a target object, and an electronic device configured to receive a measured reflectance spectrum; and
a server apparatus connected to the spectroscopic terminal apparatus through a communication line,
wherein the electronic device comprises:
a photographic camera configured to photograph the target object to capture a photographed image;
a Global Positioning System (GPS) communication unit configured to measure a location of the target object;
a sensor configured to measure an azimuth angle ($\theta$) with the target object based on true north based on geomagnetism, and an inclination angle ($\phi$) with respect to a horizontal plane with the target object as a center, at each location of the electronic device about the target object;
a Central Processing Unit (CPU) configured to generate and output times of the photographing and the measurement; and
a wireless communication unit configured to transmit the photographed image, the location of the target object, the azimuth angle ($\theta$) and the inclination angle ($\phi$), and the times of the photographing and the measurement, together with the received reflectance spectrum, to the server apparatus,
wherein the electronic device is configured to:
(1) capture information on the azimuth angle ($\theta$) and the inclination angle ($\phi$) specifying an incident direction of sunlight by the sensor;
(2) capture location information required for deriving a solar angle by the GPS communication unit, and capture time information by the CPU;
(3) associate photographed image data captured by the photographic camera with a time captured by the CPU;
(4) receive the reflectance spectrum measured by the spectrometer, and transmit the received reflectance spectrum to the server apparatus in association with the photographed image data and supplementary information captured by the photographic camera, thereby allowing the server apparatus to collect reflectance spectrum data from a plurality of azimuth angles (θ) and a plurality of inclination angles (φ) with respect to the target object, wherein the supplementary information includes:

(a) location information captured by the GPS communication unit;

(b) the solar angle derived from the time of measurement measured by the CPU and the location information captured by the GPS communication unit;

(c) a direction of incidence of the sunlight derived from information of the azimuth angle (θ) and a tilt angle (φ) captured from the sensor; and (d) a measuring time measured by the CPU, and wherein the electronic device is further configured to:

(5) capture the collected reflectance spectrum data as measurement data for a predetermined bidirectional reflectance distribution function; and (6) execute a type and state determination process for the target object by converting the collected reflectance spectrum data into reflectance spectrum data at a desired azimuth angle and inclination angle, using the predetermined bidirectional reflectance distribution function.

2. The object state detection and transmission system as claimed in claim 1, wherein the target object is a plant, an animal, a crop, medical matter, a mineral, or a food.

3. The object state detection and transmission system as claimed in claim 1, wherein the electronic device is a smartphone.

4. The object state detection and transmission system as claimed in claim 1, wherein the electronic device comprising the photographic camera is configured to be mounted on a satellite, and the satellite is configured to wirelessly transmit the photographed image to the server apparatus.

5. A spectroscopic terminal apparatus integrally including a spectrometer configured to measure a reflectance spectrum based on reflected light reflected by a target object, and an electronic device configured to receive a measured reflectance spectrum, wherein the electronic device comprises:

a photographic camera configured to photograph the target object to capture a photographed image;

a Global Positioning System (GPS) communication unit configured to measure a location of the target object;

a sensor configured to measure an azimuth angle (θ) with the target object based on true north based on geomagnetism, and an inclination angle (φ) with respect to a horizontal plane with the target object as a center, at each location of the electronic device about the target object;

a Central Processing Unit (CPU) configured to generate and output times of the photographing and the measurement; and a wireless communication unit configured to transmit the photographed image, the location of the target object, the azimuth angle (θ) and the inclination angle (φ), and the times of the photographing and the measurement, together with the received reflectance spectrum, to a server apparatus, and wherein the electronic device is configured to:

(1) capture information on the azimuth angle (θ) and the inclination angle (φ) specifying an incident direction of sunlight by the sensor;

(2) capture location information required for deriving a solar angle by the GPS communication unit, and capture time information by the CPU;

(3) associate photographed image data captured by the photographic camera with the time captured by the CPU;

(4) receive the reflectance spectrum measured by the spectrometer, and transmit the received reflectance spectrum to the server apparatus in association with the photographed image data and supplementary information captured by the photographic camera, thereby allowing the server apparatus to collect reflectance spectrum data from a plurality of azimuth angles (θ) and a plurality of inclination angles (φ) with respect to the target object, wherein the supplementary information includes:

(a) location information captured by the GPS communication unit;

(b) the solar angle derived from the time of measurement measured by the CPU and the location information captured by the GPS communication unit;

(c) a direction of incidence of the sunlight derived from information of the azimuth angle (θ) and a tilt angle (φ) captured from the sensor; and (d) a measuring time measured by the CPU, and wherein the electronic device is further configured to:

(5) capture the collected reflectance spectrum data as measurement data for a predetermined bidirectional reflectance distribution function; and (6) execute a type and state determination process for the target object by converting the collected reflectance spectrum data into reflectance spectrum data at a desired azimuth angle and inclination angle, using the predetermined bidirectional reflectance distribution function.

6. The spectroscopic terminal apparatus as claimed in claim 5, wherein the target object is a plant, an animal, a crop, medical matter, a mineral, or a food.

7. The spectroscopic terminal apparatus as claimed in claim 5, wherein the electronic device is a smartphone.

8. The spectroscopic terminal apparatus as claimed in claim 5, wherein the electronic device comprising the photographic camera is configured to be mounted on a satellite, and the satellite is configured to wirelessly transmit the photographed image to the server apparatus.

9. A control method for an electronic device for use in a spectroscopic terminal apparatus integrally including a spectrometer which is configured to measure a reflectance spectrum based on reflected light reflected by a target object, and the electronic device which is configured to receive a measured reflectance spectrum, wherein the electronic device comprises:

a photographic camera configured to photograph the target object to capture a photographed image;

a Global Positioning System (GPS) communication unit configured to measure a location of the target object;

a sensor configured to measure an azimuth angle (θ) with the target object based on true north based on geomagnetism, and an inclination angle (φ) with respect to a horizontal plane with the target object as a center, at each location of the electronic device about the target object;

a Central Processing Unit (CPU) configured to generate and output times of the photographing and the measurement; and a wireless communication unit configured to transmit the photographed image, the location of the target object, the azimuth angle ($\theta$) and the inclination angle ($\phi$), and the times of the photographing and the measurement together with the received reflectance spectrum, to a server apparatus, wherein the control method includes:

controlling the photographic camera to photograph the target object to capture the photographed image;

controlling the GPS communication unit to measure the location of the target object;

controlling the sensor to measure the azimuth angle ($\theta$) and the inclination angle ($\phi$) of the target object; and controlling the wireless communication unit to transmit the photographed image, the location of the target object, the azimuth angle ($\theta$) and the inclination angle ($\phi$) of the target object, and the times of the photographing and the measurement together with the received reflectance spectrum, to the server apparatus;

(1) capturing information on the azimuth angle ($\theta$) and the inclination angle ($\phi$) specifying an incident direction of sunlight by the sensor;

(2) capturing location information required for deriving a solar angle by the GPS communication unit, and capturing time information by the CPU;

(3) associating photographed image data captured by the photographic camera with the time captured by the CPU; and (4) receiving the reflectance spectrum measured by the spectrometer, and transmitting the received reflectance spectrum to the server apparatus in association with the photographed image data and supplementary information captured by the photographic camera, thereby allowing the server apparatus to collect reflectance spectrum data from a plurality of azimuth angles ($\theta$) and a plurality of inclination angles ($\phi$) with respect to the target object, wherein the supplementary information includes:

(a) location information captured by the GPS communication unit;

(b) the solar angle derived from the time of measurement measured by the CPU and the location information captured by the GPS communication unit;

(c) a direction of incidence of the sunlight derived from information of the azimuth angle ($\theta$) and a tilt angle ($\varphi$) captured from the sensor; and (d) a measuring time measured by the CPU, and wherein the control method further includes:

(5) capturing the collected reflectance spectrum data as measurement data for a predetermined bidirectional reflectance distribution function; and (6) executing a type and state determination process for the target object by converting the collected reflectance spectrum data into reflectance spectrum data at a desired azimuth angle and inclination angle, using the predetermined bidirectional reflectance distribution function.

10. A non-transitory control program comprising respective steps of a control method, which is configured to be executed by an electronic device, wherein the control method is provided for the electronic device for use in a spectroscopic terminal apparatus integrally including a spectrometer which is configured to measure a reflectance spectrum based on reflected light reflected by a target object, and the electronic device which is configured to receive a measured reflectance spectrum, wherein the electronic device comprises:

a photographic camera configured to photograph the target object to capture a photographed image;

a Global Positioning System (GPS) communication unit configured to measure a location of the target object;

a sensor configured measure an azimuth angle ($\theta$) with the target object based on true north based on geomagnetism, and an inclination angle ($\phi$) with respect to a horizontal plane with the target object as a center, at each location of the electronic device about the target object;

a Central Processing Unit (CPU) configured to generate and output times of the photographing and the measurement; and a wireless communication unit configured to transmit the photographed image, the location of the target object, the azimuth angle ($\theta$) and the inclination angle ($\phi$), and the times of the photographing and the measurement, together with a received reflectance spectrum, to a server apparatus, wherein the control method includes:

controlling the photographic camera to photograph the target object to capture the photographed image;

controlling the GPS communication unit to measure the location of the target object;

controlling the sensor to measure the azimuth angle ($\theta$) and the inclination angle ($\phi$) of the target object; and controlling the wireless communication unit to transmit the photographed image, the location of the target object, the azimuth angle ($\theta$) and the inclination angle ($\phi$) of the target object, and the times of the photographing and the measurement together with the received reflectance spectrum, to the server apparatus;

(1) capturing information on the azimuth angle ($\theta$) and the inclination angle ($\phi$) specifying an incident direction of sunlight by the sensor;

(2) capturing location information required for deriving a solar angle by the GPS communication unit, and capturing time information by the CPU;

(3) associating photographed image data captured by the photographic camera with the time captured by the CPU; and (4) receiving the reflectance spectrum measured by the spectrometer, and transmitting the received reflectance spectrum to the server apparatus in association with the photographed image data and supplementary information captured by the photographic camera, thereby allowing the server apparatus to collect reflectance spectrum data from a plurality of azimuth angles ($\theta$) and a plurality of inclination angles ($\phi$) with respect to the target object, wherein the supplementary information includes:

(a) location information captured by the GPS communication unit;

(b) the solar angle derived from the time of measurement measured by the CPU and the location information captured by the GPS communication unit;

(c) a direction of incidence of the sunlight derived from information of the azimuth angle ($\theta$) and a tilt angle ($\varphi$) captured from the sensor; and (d) a measuring time measured by the CPU, and
wherein the control method further includes:
(5) capturing the collected reflectance spectrum data as measurement data for a predetermined bidirectional reflectance distribution function; and
(6) executing a type and state determination process for the target object by converting the collected reflectance spectrum data into reflectance spectrum data at a desired azimuth angle and inclination angle, using the predetermined bidirectional reflectance distribution function.

11. A non-transitory computer-readable recording medium that stores a control program,
wherein the control program comprises respective steps of a control method, which is configured to be executed by an electronic device,
wherein the control method is provided for the electronic device for use in a spectroscopic terminal apparatus integrally including a spectrometer which is configured to measure a reflectance spectrum based on reflected light reflected by a target object, and the electronic device which is configured to receive a measured reflectance spectrum,
wherein the electronic device comprises:
a photographic camera configured to photograph the target object to capture a photographed image;
a Global Positioning System (GPS) communication unit configured to measure a location of the target object;
a sensor configured to measure an azimuth angle ($\theta$) with the target object based on true north based on geomagnetism, and an inclination angle ($\phi$) with respect to a horizontal plane with the target object as a center, at each location of the electronic device about the target object;
a Central Processing Unit (CPU) configured to generate and output times of the photographing and the measurement; and
a wireless communication unit configured to transmit captured photographed image, the location of the target object, the azimuth angle ($\theta$) and the inclination angle ($\phi$), and the times of the photographing and the measurement, together with a received reflectance spectrum, to a server apparatus,
wherein the control method includes:
controlling the photographic camera to photograph the target object to capture the photographed image;
controlling the GPS communication unit to measure the location of the target object;
controlling the sensor to measure the azimuth angle ($\theta$) and the inclination angle ($\phi$) of the target object; and
controlling the wireless communication unit to transmit the photographed image, the location of the target object, the azimuth angle ($\theta$) and the inclination angle ($\phi$) of the target object, and the times of the photographing and the measurement together with the received reflectance spectrum, to the server apparatus, and
(1) capturing information on the azimuth angle ($\theta$) and the inclination angle ($\phi$) specifying an incident direction of sunlight by the sensor;
(2) capturing location information required for deriving a solar angle by the GPS communication unit, and capturing time information by the CPU;
(3) associating photographed image data captured by the photographic camera with the time captured by the CPU; and
(4) receiving the reflectance spectrum measured by the spectrometer, and transmitting the received reflectance spectrum to the server apparatus in association with the photographed image data and supplementary information captured by the photographic camera, thereby allowing the server apparatus to collect reflectance spectrum data from a plurality of azimuth angles ($\theta$) and a plurality of inclination angles ($\phi$) with respect to the target object,
wherein the supplementary information includes:
(a) location information captured by the GPS communication unit;
(b) the solar angle derived from the time of measurement measured by the CPU and the location information captured by the GPS communication unit;
(c) a direction of incidence of the sunlight derived from information of the azimuth angle ($\theta$) and a tilt angle ($\varphi$) captured from the sensor; and
(d) a measuring time measured by the CPU, and
wherein the control method further includes:
(5) capturing the collected reflectance spectrum data as measurement data for a predetermined bidirectional reflectance distribution function; and
(6) executing a type and state determination process for the target object by converting the collected reflectance spectrum data into reflectance spectrum data at a desired azimuth angle and inclination angle, using the predetermined bidirectional reflectance distribution function.

12. A non-transitory server apparatus for use in an object state detection and transmission system comprising:
a spectroscopic terminal apparatus integrally including a spectrometer configured to measure a reflectance spectrum based on a reflected light reflected by a target object, and an electronic device configured to receive a measured reflectance spectrum; and
the non-transitory server apparatus being connected to the spectroscopic terminal apparatus through a communication line,
wherein the electronic device comprises:
a photographic camera configured to photograph the target object to capture a photographed image;
a Global Positioning System (GPS) communication unit configured to measure a location of the target object;
a sensor configured to measure an azimuth angle ($\theta$) with the object based on true north based on geomagnetism, and an inclination angle ($\phi$) with respect to a horizontal plane with the target object as a center, at each location of the electronic device about the target object;
a Central Processing Unit (CPU) configured to generate and output times of the photographing and the measurement; and
a wireless communication unit configured to transmit captured photographed image, the location of the target object, the azimuth angle ($\theta$) and the inclination angle ($\phi$), and the times of the photographing and the measurement, together with a received reflectance spectrum, to the non-transitory server apparatus,
wherein the electronic device is configured to:
(1) capture information on the azimuth angle ($\theta$) and the inclination angle ($\phi$) specifying an incident direction of sunlight by the sensor;
(2) capture location information required for deriving a solar angle by the GPS communication unit, and capture time information by the CPU;

(3) associate photographed image data captured by the photographic camera with a time captured by the CPU; and
(4) receive the reflectance spectrum measured by the spectrometer, and transmit the received reflectance spectrum to the non-transitory server apparatus in association with the photographed image data and supplementary information captured by the photographic camera, thereby allowing the non-transitory server apparatus to collect reflectance spectrum data from a plurality of azimuth angles (θ) and a plurality of inclination angles (φ) with respect to the target object,
wherein the supplementary information includes:
(a) location information captured by the GPS communication unit;
(b) the solar angle derived from the time of measurement measured by the CPU and the location information captured by the GPS communication unit:
(c) a direction of incidence of the sunlight derived from information of the azimuth angle (θ) and a tilt angle (φ) captured from the sensor; and
(d) a measuring time measured by the CPU, and
wherein the electronic device is further configured to:
(5) capture the collected reflectance spectrum data as measurement data for a predetermined bidirectional reflectance distribution function, and
wherein the non-transitory server apparatus is configured to execute a type and decision process for the target object after receiving the photographed image, the location of the target object, the azimuth angle (θ) and the inclination angle (φ) of the target object, the times of the photographing and the measurement, and the collected reflectance spectrum data from the electronic device.

13. The non-transitory server apparatus as claimed in claim 12,
wherein the non-transitory server apparatus is a terminal apparatus connected to the communication line.

* * * * *